US005650684A

United States Patent [19]
Suganuma

[11] Patent Number: 5,650,684
[45] Date of Patent: Jul. 22, 1997

[54] ROTATING BODY AND MACHINES INCORPORATING SAME

[75] Inventor: Noriyuki Suganuma, Yokohama, Japan

[73] Assignee: Newstein lab., Inc., Kanagawa, Japan

[21] Appl. No.: 273,128

[22] Filed: Jul. 14, 1994

[30] Foreign Application Priority Data

Jul. 14, 1993 [JP] Japan .................................. 5-196817
May 16, 1994 [JP] Japan .................................. 6-127008

[51] Int. Cl.$^6$ .............................. H02K 1/22; H02K 5/24; G01M 1/16
[52] U.S. Cl. ..................... 310/261; 310/51; 74/573 R; 72/461; 464/180; 116/144
[58] Field of Search ............... 310/51, 261; 416/144; 464/180; 74/573 R; 301/5.21; 384/199; 73/66, 461, 468

[56] References Cited

U.S. PATENT DOCUMENTS 5,129,284  7/1992  Brueckner et al. .................... 416/144

OTHER PUBLICATIONS

JIS B 0905-1992 Japanese Industrial Standard: Rotating machines—Balance quality requirements of rigid motors.
ISO 1940/1-1986 (E) International Standard: Mechanical vibration—Balance quality requirements of rigid rotors—Part 1: Determination of permissible residual unbalance.

*Primary Examiner*—Clayton E. LaBalle
*Attorney, Agent, or Firm*—Greenblum & Bernstein P.L.C.

[57] ABSTRACT

In a rotating body or machinery that is equipped with at least one such rotating body, the power loss resulting from the inertial force, which is an internal force caused by the rotation of the rotating body, contributes to mechanical inefficiency, as well as being the cause of unnecessary heat generation, unnecessary machine strength requirements, increased weight, and increased costs. Provided are low-loss machines and engines that essentially eliminate or greatly reduce the power loss due to the aforementioned inertial force. The rotating body of this invention, or machine which is equipped with at least one such rotating body, greatly reduces or essentially makes zero the power loss resulting from the inertial force generated by the rotating or rocking motion of the rotating body due to its poor mass distribution. This inertial force is an internal force of a new concept which excludes the centrifugal force.

50 Claims, 14 Drawing Sheets

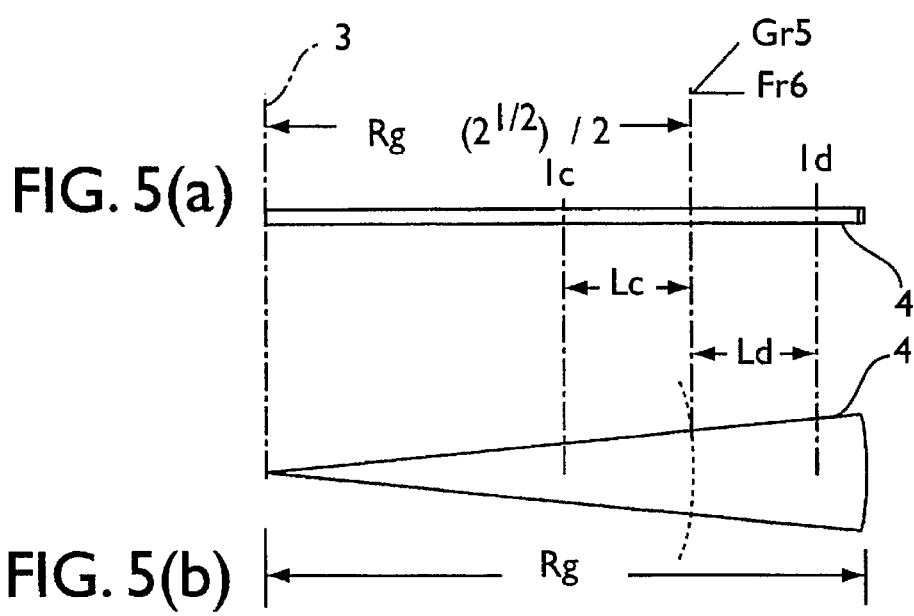
FIG. 5(a)
FIG. 5(b)
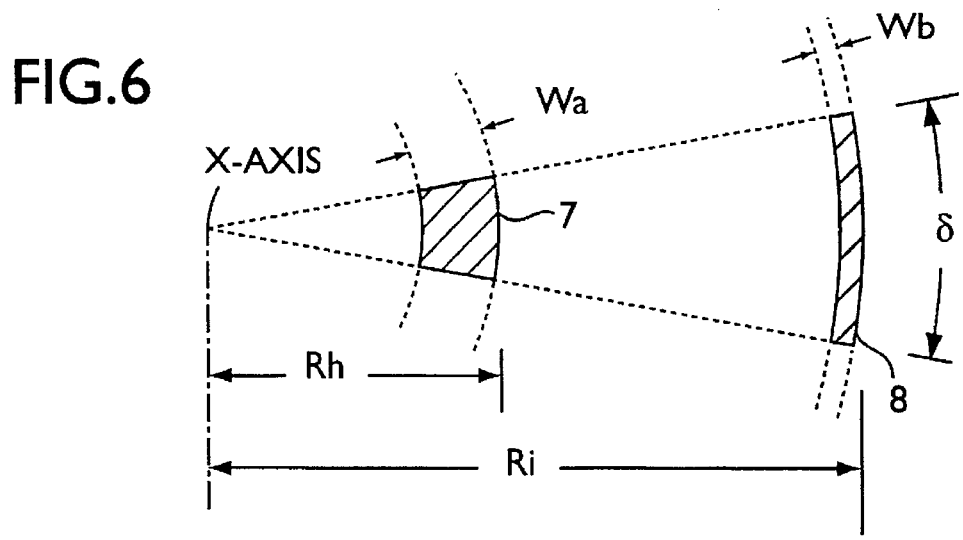
FIG. 6

FIG. 9(a)
FIG. 9(b)
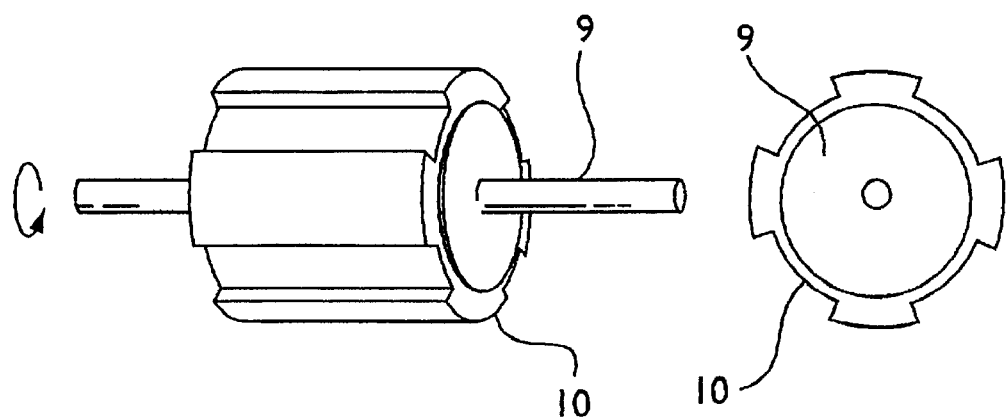
FIG. 10
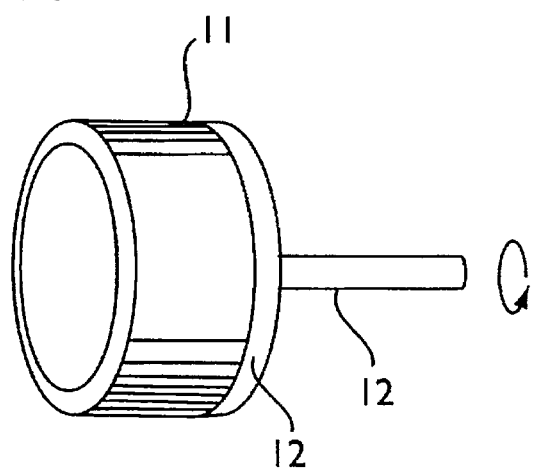

FIG. 13(a)
FIG. 13(b)
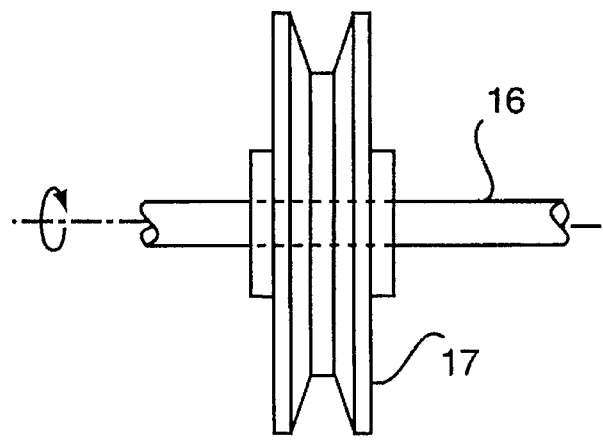
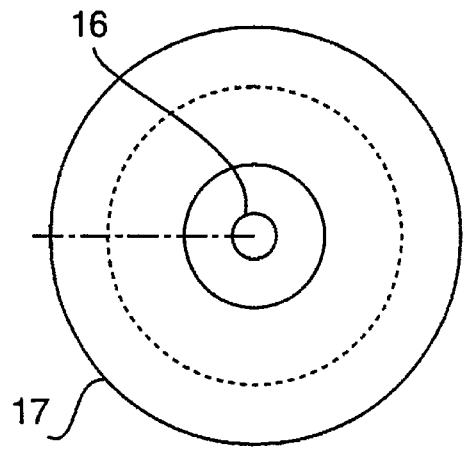
FIG. 14
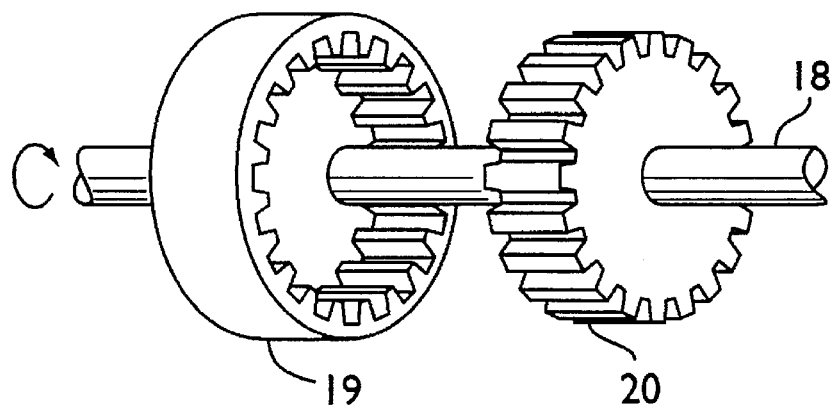

DIRECTION OF ROTATION

ROTATING BODY AND MACHINES INCORPORATING SAME

BACKGROUND OF THE INVENTION

1. Field of the Invention

This invention relates to a rotating body that performs rotating motion or rocking motion, and to machines that use at least one such rotating body. The machines disclosed herein include a wide variety of mechanisms, machines, and mechanical equipment.

2. Description of Prior Art

Previously, the reduction of power loss during operation of a rotating body that performs rotating motion or rocking motion, has been addressed in many various technical fields by such techniques as reducing the weight of components, improving the mechanism (e.g., strength) and improvement of generated heat removal and/or reduction of heat generation by reducing frictional forces.

However, the theoretical background related to the reduction of dynamic losses of a rotating body caused by inertial forces that are generated due to rotating motion or rocking motion has been heretofore deficient.

The term power, as defined by the field of dynamics, is expressed as the product of the two vector quantities: force and the velocity of the point where the force acts. Thus, if the vectors of the two aforementioned physical quantities (i.e., force and the velocity of the point where the force acts) are perpendicular to each other, the power which had been required to move the body is no longer required.

Until now, it has been thought that the power related to the inertial force, including the so-called centrifugal force, generated in a rotating body due to the circular or rotating motion, disappears as described above, upon reaching steady state. The underlying reason for this, albeit faulty reasoning, is the mistaken assumption that the two vectors (i.e., inertial force and the velocity of the point on which it acts) are perpendicular to each other.

This invention relates to a technical field that, until now, has been deficient and has not been completely made clear. The present invention reduces power losses caused by inertial forces generated by the rotation of a rotating body.

Heretofore, unnecessary power losses in a rotating body of a machine that is in operation, were addressed as being caused by harmful heat generation, and this required the use of improved cooling equipment to relieve this problem, or increased mechanism strength, each of which necessarily requires increased weight and increased cost to try to compensate for the inertial force.

SUMMARY OF THE INVENTION

An objective of this invention is to improve upon the aforementioned problems of the prior art, and to provide a rotating body and machines that use at least one such rotating body to reduce unnecessary power losses. More particularly, an objective of the present invention is to provide a rotating body and machines that use at least one such rotating body, where the rotating body is characterized by an axis of the center of gravity of the rotating motion or rocking motion of the rotating body as the X-axis, and the deviation of the principal axis of inertia is reduced or essentially eliminated. The deviation of the principal axis of inertia is defined as the difference between the partial center of gravity and the partial principal axis of inertia of a section of the rotating body that is perpendicular to the aforementioned X-axis of the rotating body.

Deviation of the principal axis of inertia is the cause of unnecessary inertial forces that are generated during rotation of a rotating body.

Examples of means for accomplishing the above-stated objectives of the instant invention are explained using five forms of the invention.

The rotating body, which performs rotating motion or rocking motion, according to a first embodiment of the instant invention, is characterized by defining the center axis of rotation or rocking motion of the rotating body as the X-axis, and where, at any arbitrary point in the rotating body along the X-axis, an arbitrary fan-shaped radial sector, having a small angle and small thickness $\Delta X$ can be taken such that it is perpendicular to the X-axis, such that its mass distribution defines a partial axis of center of gravity which is parallel to the X-axis. Also, the aforementioned partial axis of center of gravity essentially matches the partial principal axis of inertia of the arbitrary fan-shaped radial sector.

In this embodiment, the deviation of the principal axis of inertia, which is the difference between the partial axis of center of gravity and the partial principal axis of inertia, is essentially made zero. If not made essentially zero, the present invention at least greatly reduces the deviation as described below. In this invention, a first embodiment is referred to as the ideal type or case.

An example of an ideal type rotating body is the rotor of an electric motor, where the rotating shaft and rotor are made of materials having the same density, and where the rotor is a solid inner rotor, as will be described later. For this type of rotor, the center of rotation is the center of the rotating shaft, and the center of rotation is supported in a fixed place by multiple bearings.

Another example of an ideal type rotating body is an ideal type connecting rod for a multi-cylinder reciprocating engine, as described in the preferred embodiments. This ideal type connecting rod has rocking motion caused by the up and down motion of a piston, and the center of rotation is the center of its small end.

For some ideal type connecting rods, the deviation of the principal axis of inertia cannot always be made completely zero. For example, if the density of the material used in the basic structure of the connecting rod is different than density of the material used in the small or large end, or in the bearings, it is not possible to make the deviation of the principal axis of inertia completely zero.

Also, in order to ensure that the connecting rod will not contact the cylinder during operation, there are examples when it is not possible to select a shape where the deviation of the principal axis of inertia becomes zero. For example, there is a case when it is necessary that the inside diameter of the large end of the connecting rod must be made relatively large compared to the inside diameter of the cylinder.

In the ideal type connecting rods of the two examples described above, there is a fan-shaped section, and the deviation of the principal axis of inertia, measured according to the method of this invention described later, can be reduced to less than half of that of connecting rods used in the prior art, even in examples where it is not possible to make it zero. Examples where it is not possible to reduce the deviation to zero are also included in this invention.

Therefore, in the instant invention as applied to the ideal type connecting rods of the two examples mentioned above, the mass is distributed so that the partial axis of center of gravity essentially matches the partial principal axis of inertia.

A second embodiment of rotating body which performs rotating motion or rocking motion, is also characterized by a center axis of rotation or rocking motion of the rotating body being designated as the X-axis, and where an arbitrary fan-shaped radial sector having a small angle, and a thickness equal to the total thickness of the rotating body along the X-axis, can be taken, such that the arbitrary fan-shaped radial sector is perpendicular to the X-axis and its mass is distributed such that it defines a partial axis of center of gravity which is parallel to the X-axis and essentially matches the partial principal axis of inertia of the fan-shaped sectors.

In the second embodiment with the fan-shaped sector whose entire thickness runs along the X-axis, the deviation of the principal axis of inertia, which is the difference between the partial axis of center of gravity and the partial principal axis of inertia, is essentially made zero or is greatly reduced as described below. The second embodiment is referred to as the real type or case.

An example of a real type rotating body is the rotor of an electric motor where the rotating shaft and the rotor are made of materials having different densities, and where the rotor is an inner rotor, as will be described later.

This real type rotor differs from the aforementioned ideal case in that it is characterized by essentially making the deviation of the principal axis of inertia zero for its entire width along the X-axis.

Another example of a real type rotating body is a real type connecting rod for a single-cylinder reciprocating engine, which has rocking motion, as described later in the preferred embodiments of the invention.

As in the case of ideal type connecting rod mentioned above, there are cases where it is impossible to make the deviation of the principal axis of inertia completely zero.

However, when compared to a connecting rod according to the prior art, the deviation of principal axis of inertia of even these cases, can be essentially reduced to half or less that of the prior art. Accordingly, this kind of real type connecting rod is also included within the scope of the instant invention.

Therefore, in the present invention, the aforementioned real type connecting rod is considered to be a rotating body, the mass distribution of which is such that the defined partial axis of center of gravity essentially matches the defined partial principal axis of inertia.

A third embodiment of this instant invention is also characterized by the center axis of rotation of the rotating body being designated as the X-axis. Part of the rotating body has an eccentric axis that is parallel to the X-axis of the rotating body. An arbitrary fan-shaped radial sector, having a small angle and small thickness of ΔX, can be taken such that it is perpendicular to the eccentric axis. The peak point of the radial sector intersects the eccentric axis that rotates around the X-axis of the rotating body. The mass distribution of the radial sector is such that its partial axis of center of gravity, which is parallel to the eccentric axis, essentially matches the partial principal axis of inertia of the radial sector.

In this kind of rotating body, the rotating portion, which is the rotating shaft, the center of rotation of which is the X-axis, is ideal, and the portion of the eccentric rotor is ideal with respect to the eccentric axis.

As an example, an eccentric shaft of a reciprocating-type compressor is described in the preferred embodiments.

According to a fourth embodiment of the instant invention, again the center of rotation of the rotating body is designated as the X-axis, and a fan-shaped rotating portion that runs along the X-axis of the rotating body is included where an arbitrary fan-shaped radial sector, having a small angle and thickness ΔX, can be taken such that it is perpendicular to the X-axis of the fan-shaped rotating portion. The mass distribution of the arbitrary fan-shaped radial sector defines a partial axis of center of gravity which is parallel to the X-axis, and essentially matches a partial principal axis of inertia of the arbitrary fan-shaped radial sector.

This kind of rotating body has a fan-shaped rotating portion that runs along the X-axis, which is the axis of rotation of the rotating body, and this fan-shaped rotating portion is ideal.

As an example, the crankshaft for a multi-cylinder reciprocating engine is described later as a preferred embodiment.

The aforementioned fan-shaped portion of the rotating body includes the crank arm section and balancing weight section of the aforementioned crankshaft.

According to a fifth embodiment of the instant invention, the center of rotation of a rotating body is designated as the X-axis, and a fan-shaped rotating portion runs along the X-axis, where an arbitrary fan-shaped radial sector that intersects the X-axis and whose thickness is the total thickness of the fan-shaped rotating portion can be taken, such that the arbitrary fan-shaped radial sector is perpendicular to the X-axis, and the mass distribution of the same defines a partial axis of center of gravity which is parallel to the X-axis, and essentially matches a partial principal axis of inertia of the arbitrary fan-shaped radial sector.

This kind of rotating body has a fan-shaped rotating portion that runs along the X-axis, which is the axis of rotation of the rotating body, and this fan-shaped rotating portion is real.

As an example, a crankshaft for a single-cylinder reciprocating engine is described later as a preferred embodiment. The aforementioned fan-shaped portion of the rotating body includes the crank arm and balancing weight of the aforementioned crankshaft.

The rotating bodies of the five embodiments referred to above, each conform to at least one of the six following items:

(a) a rotating body that has a two-way energy conversion function between electrical energy and mechanical energy;

(b) a rotating body with multiple vanes or blades, to be used in the movement, compression, conversion of force, or conversion of power of a fluid such as air, steam, gas, combustible matter, water, or oil;

(c) a rotating body used in a mechanism that converts between linear motion and rotating motion;

(d) a rotating body used in a rotating mechanism of a prime mover or compressor;

(e) a rotating body, the axis of rotation of which is the center of the rotating shaft, where the shaft has a power transmission function; and (f) a rotating body that has rotating motion and is supported by multiple bearings.

The rotating body of the instant invention, constructed according to this invention, as described in the instant specification, essentially makes zero or greatly reduces the power losses caused by the deviation of the principal axis of inertia mentioned above, and further maintains the rotating or rocking motion of the same.

Also, machines that use at least one such rotating body, essentially eliminate or greatly reduce power losses during operation due to the deviation of the principal axis of inertia.

The actions and details of the above-mentioned five embodiments of invention are explained in order below. Regarding the ideal type rotating body of the first embodiment, there is essentially no power lost due to the deviation of the principal axis of inertia of the rotating portion with arbitrary minute thickness that is perpendicular to the X-axis, or it is greatly reduced.

As to the real type rotating body of the second embodiment there is essentially no power lost due to the deviation of the principal axis of inertia in the rotating portion whose entire thickness is perpendicular to the X-axis, or it is greatly reduced.

In this kind of real type rotating body, when it is possible to consider that the rotating body is essentially a rigid body, the power lost due to the rotating or rocking motion is the same as for the aforementioned ideal type rotating body as it will be described later.

As to the third embodiment, there is essentially no power loss due to the deviation of the principal axis of inertia, in the rotating portion with an arbitrary minute thickness that is perpendicular to the X-axis.

In this kind of rotating body, the deviation of the principal axis of inertia, including the portion of the eccentric rotor, is essentially zero.

However, in the portion of the eccentric rotor, there is no way to avoid the centrifugal force or well known couple moment caused by the deviation of the center of gravity.

Regarding the fourth form of this invention, there is essentially no power loss due to the deviation of the principal axis of inertia in the rotating portion, which has an arbitrary minute thickness and which is perpendicular to the X-axis.

In this kind of rotating body, including the fan-shaped rotating portion, the deviation of the principal axis of inertia is essentially zero.

However, in multiple fan-shaped rotating portions, there is no way to avoid couple moment that is caused by the deviation of the center of gravity.

Regarding the fifth embodiment of the instant invention, there is essentially no power lost due to the deviation of the principal axis of inertia in the rotating portion whose total thickness is perpendicular to the X-axis.

In this kind of rotating body, there is no way to avoid the centrifugal force when there is only one fan-shaped rotating portion, and there is no way to avoid the couple moment when there are multiple fan-shaped rotating portions.

The present disclosure relates to subject matter contained in Japanese patent applications Nos. 5-196817 (filed on Jul. 14, 1993) and 6-127008 (filed on May 16, 1994) which are expressly incorporated by reference herein in their entireties.

BRIEF DESCRIPTION OF THE DRAWINGS

FIG. 5 (a) is a side view and FIG. 5 (b) is a front view of the radial sector used in explaining the basic theory of the present invention;

FIG. 6 is a front view of a hollow cylindrical shaft and ring used in explaining the basic theory of the present invention;

FIG. 9 (a) is a pictorial view and FIG. 9 (b) is a front view showing an ideal type inner rotor of an embodiment according to the instant invention;

FIG. 10 is a pictorial view showing an ideal type outer rotor of an embodiment of the instant invention;

FIG. 13 (a) is a side view (a); and FIG. 13 (b) is a front view showing an ideal type pulley of an embodiment according to the present invention;

FIG. 14 is a pictorial view showing a real type spur gear of an embodiment according to the instant invention;

DESCRIPTION OF THE PREFERRED EMBODIMENTS

Figure 1:
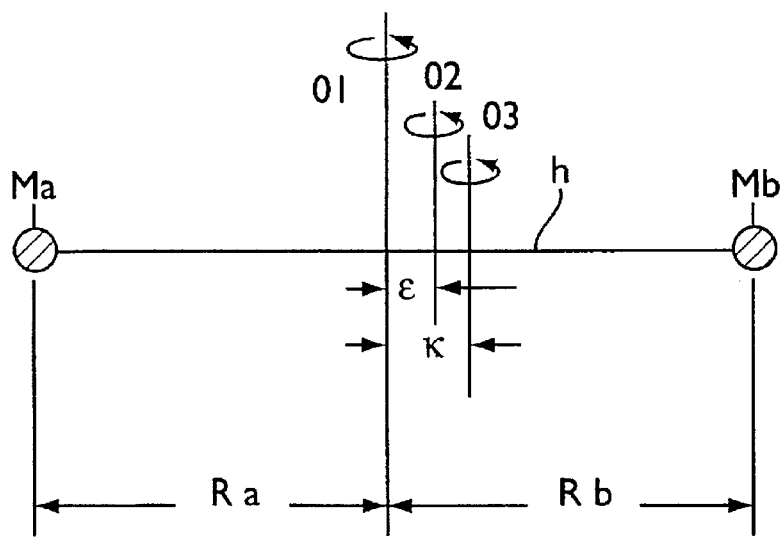
FIG. 1 is a drawing explaining the basic theory of this invention using a system of particles where two particles are located on the end of a rigid rod, the mass of which can be ignored.

The embodiments of the rotating body of this invention and machines that use at least one such rotating body will be explained first based on the dynamic background related to the functional theory of the rotating body.

In dynamics, if a body is moved due to a force that is acting on it, that force is defined to have performed work, and the rate at which that work is performed is defined as the power.

Power is expressed as a scalar quantity that is the inner product of the force and the velocity at which the point that the force acts on moves. The force and the velocity at which the point that the force acts on moves, are vector quantities.

As was explained previously, the present invention essentially eliminates (i.e., makes zero) or greatly reduces the power loss in a rotating body that is caused by the inertial force.

In the prior art, a mistaken assumption was made. The mistaken assumption was that the inner product of the two vector quantities, which are internal force in the body due to rotation of the body, and the velocity of the point on which the inertial force acted, was zero.

To force consistency with this mistaken assumption, and prevent theoretical contradictions of this mistake, the mechanical vibrations caused by the rotation of the rotating body in an electric motor or engine were not thought of as being power loss.

According to Newton's laws of motion, the two vectors of a force acting on a body, and the velocity at which the body is moved by the force, coincide. Thus, if the aforementioned mechanical vibrations are caused by action of the centrifugal force, the two vectors of the mechanical vibration and the centrifugal force must coincide according to Newton's laws, and therefore the mechanical vibration must be regarded as power loss.

If, on the other hand, this lost power is denied, overlooked, or considered negligible, then, at the same time, Newton's laws of motion must also be denied. However, there are no rational grounds for doing so, therefore, it must be concluded that the mechanical vibration accompanies lost power.

Circular motion of a body will now be explained in more detail. First, imagine a particle m being secured to the end of a rigid bar h wherein the mass of bar h can be neglected. The particle m is forced to rotate at a constant velocity around a stationary axis, with the radius being r, and the angular velocity being $\omega$.

In order to rotate the particle m, a torque, T=rN, must be applied. In other words, when an external tangential vector force N is applied to particle m, and the velocity which the tangential vector cause the particle m to move at is designated as v, the power required to cause the particle m to move linearly can be expressed as, P=Nv=Tv/r.

Particle m, which is biased linearly in the tangential direction by the torque T, but is pulled back toward the center of the circular motion around a circumference of radius r by the rigid bar. The change of direction caused by the rigid bar h, causes a centripetal force to act upon the particle m, as defined by dynamics.

Centripetal force, F, is expressed as $F=mr\omega^2$, and the velocity of particle m due to the centripetal force F is $s=r\omega$. The quantity s is a physical quantity of the normal vector facing the center of the circular motion.

During circular motion, the centripetal force F can be considered to be the acting force, for either the case when the product of inertia of particle m, as seen from the center of the circular motion, is $mr^2$, or when particle m moves with constant circular motion and has a deviation from the center of gravity r.

The power P required to keep particle m moving continuously at a constant angular velocity $\omega$, is equal to the power L required to move particle m at a constant circular speed, and can be expressed as, $P=L=mr^2\omega^3$.

In the consideration relating to power mentioned above, it is possible to consider the fictitious centrifugal force, rather than centripetal force of the coordinate system attached to particle m. By analyzing the circular motion of the single particle m, described above, the following dynamic interpretation is possible.

First, if the circular motion of the rotating body satisfies the law of conservation of angular momentum, there is no power loss. In other words, if there is no power loss in conditions where it is possible to neglect the losses due to friction and air resistance, then a rotating body that is starting to rotate will continue to rotate forever.

Second, if the inertial forces occurring inside the rotating body due to the rotation are considered, then in order to forcibly cause the rotating body to continue rotating, an external force must be applied to the body.

Accordingly, even in conditions where losses due to friction and air resistance are ignored, power is still required to forcibly cause the rotating body to continue rotating, since internal inertial forces are acting on the rotating body.

The circular motion of a single particle was explained above. Next, multiple particles forming a single system of particles will be explained, where the system of particles is rigid (i.e., the relative position of the particles in the system does not change) and there is relative action of the forces between the multiple particles.

First, consider the circular motion of the system around the axis 01, as shown in FIG. 1. Particles Ma and Mb are relatively positioned on the rod so that they are orthogonal to the axes 01 through 03. The deviation of center of gravity is $\epsilon$, the distance from the axis of center of gravity to principal axis of inertia is $\kappa$, the distance from axis 01 to the particle Ma is Ra, and the distance from the axis 01 to particle Mb is Rb.

In this case, Ma=Mb, and Ra=Rb, and axis 01 coincides with the center of gravity of the system. In other words, axis 01 coincides with the principal axis of inertia where the product of inertia for the system is zero. In this case the product of inertia of the system can be considered to be zero, for rotation of this system around axis 01. Also, the deviation of the axis of center of gravity is zero. Therefore, there is no centrifugal force acting of the system. The two centrifugal forces, $Ma*Ra*\omega^2$, and $Mb*Rb*\omega^2$, (where $\omega$=angular velocity) are not generated and they are not cancelling each other.

Accordingly, there is no centrifugal force or centripetal force acting on the system of particles, and angular momentum is conserved. Thus, it can be concluded that there is no power loss, and the system of particles rotates as if the total mass of the system were concentrated on the center of gravity (axis 01).

An example of such a system is a well balanced top that continues to spin for a long time.

Next, described is an example as shown in FIG. 1, where the conditions, Ma=Mb and Ra=Rb, are satisfied, and the axis 01 coincides with the axis of center of gravity, but where the axis of rotation, 02, has deviated from the center of gravity by a distance $\epsilon$ toward Mb.

The value of the product of inertia of the system around the axis of rotation 02 is $-(Ma+Mb) \epsilon^2$. Therefore, when the axis 02 is the axis of rotation, and the system is forcibly caused to continue rotating at angular velocity $\omega$, a centrifugal force vector, $Fa=-(Ma+Mb) \epsilon\omega^2$, in the direction of particle Ma occurs at axis 01, and as the direction of the vector changes with the rotation of the system, it acts on axis 02.

The power required for this situation can be expressed as $Pa=(Ma+Mb) \epsilon^2\omega^3$.

In the system of particles shown in FIG. 1 where the equations, Ma*Ra=Mb*Rb, and Ma $(Ra+\kappa)^2$=Mb $(Rb-\kappa)^2$, are satisfied, the cases when axis 01 and axis 03 are taken to be the axis of rotation are explained below.

When axis 03 is the axis of rotation, the product of inertia of the system around axis 03 is zero, and the deviation of the axis of center of gravity is $\epsilon=\kappa$.

Here, the centrifugal force, $Fb=-(Ma+Mb) \kappa\omega^2$, is a vector in direction of particle Ma and occurring at axis 01, and as the direction of the vector changes with the rotation of the system, the force acts on axis 03.

In the case where the axis 01 is the axis of rotation, the value of the product of inertia of the system around axis 01 is $-(Ma+Mb) \kappa^2$, and the deviation of the axis of center of gravity is zero.

The inertial force that occurs in the system of particles due to the rotation as distinguished from the centrifugal force, is a vector force in the direction of particle Ma, and can be expressed as, $Fc=-(Ma+Mb)\kappa\omega^2$, and, based on the theory of action and reaction, as the vector changes direction due to rotation, the force acts on axis 01.

Therefore, in accordance with the centrifugal force Fb or inertial force Fc mentioned above, the power that must be added to keep the system of particles rotating at a constant velocity, can be expressed as, $Pb=(Ma+Mb)\kappa^2\omega^3$.

ALSO, when the axis of rotation is between axis 01 and axis 03, the inertial force acting on that axis of rotation has the same value as Fb or Fc.

The inertial force Fc, is a force that is caused by the deviation of the principal axis of inertia $\kappa$, and it is sometimes referred to as the deviated force. Thus, the inertial or deviated force differs from the centrifugal force caused by the deviation of the center of gravity $\epsilon$.

The inertial forces, Fa, Fb (the centrifugal force is a particular type of inertial force), and Fc, (inertial force Fd, which will be described later, is omitted) which are the cause of the vibrations upon rotation of the rotating body, can be reduced by using a well known technique for adjusting the imbalance of the rotating body.

A technique for "balancing rotating bodies" is widely used as an effective means for reducing harmful mechanical vibrations that are caused by centrifugal forces occurring in the mass portion of a rotating body during rotation. This technique is described in more detail in specifications such as JIS standard B0905, "Benefits of Balanced Rotating Machinery", and standard ISO1940, "Balance Quality of Rotating Rigid Bodies". This method of balancing rotating bodies may be applied to the rotating bodies of the present invention, but it is not a necessary condition.

Figure 2:
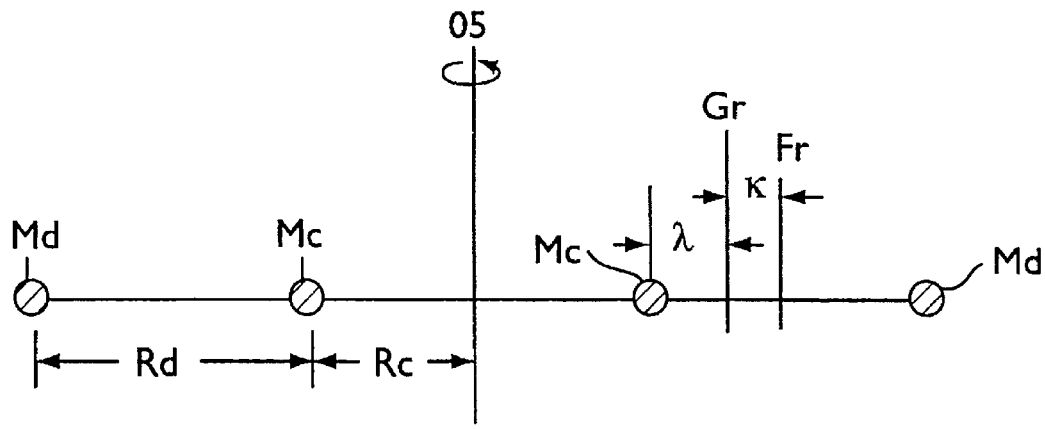
FIG. 2 is a drawing explaining the basic theory of this invention using a system of particles where four particles are attached to a rigid rod, the mass of which can be ignored.

Turning to FIG. 2, the theoretical dynamic background underlying internal power loss of a rotating body will be explained.

The system of particles in FIG. 2, comprises two particles, Mc, relatively spaced on the right and left side of axis 05, and separated from axis 05 by a distance, Rc, and two particles, Md, relatively spaced on the right and left side of axis 05, and separated from axis 05 by a distance, (Rc+Rd).

The pair of particles Mc and Md are relatively positioned on the rod so that they are orthogonal to the axis 05. The axis of the center of gravity is 05, the partial axis of the center of gravity is Gr, the partial principal axis of inertia is Fr, the distance from axis 05 to particle Mc is Rc, and the distance from Mc to Md is Rd.

When the masses of particles Mc and Md are different (i.e., Mc≠Md) and the system of particles is forced to rotate around axis 05, the axis of center of gravity and principal axis of inertia both coincide with the axis 05. Accordingly, no vibratile centrifugal force acts on the system.

However, the inertial force caused by the deviation of the partial principal axis of inertia, $\kappa$, which is the difference between the partial axis of center of gravity Gr, and the partial principal axis of inertia Fr, must be considered.

If the mass of particles Mc>Md, then the location of the partial axis of center of gravity Gr, is closer to particle Mc than is the partial axis of inertia Fr, and if the mass of particles Mc<Md, then the location is just the opposite.

If the system of particles continues to be rotated around axis 05 at a constant angular velocity $\omega$, and if the mass of particles Mc>Md, the pair of inertial forces on the right and left are opposing vectors expressed by the physical quantity, $+/-Fd=(Mc+Md)\kappa\omega^2$ and no vibration of the axis of rotation, (axis 05) is caused by the inertial forces. The inertial forces act internally on the system of particles in this situation.

This pair of inertial forces are caused by the relative action of the particles of the system due to rotation.

The pair of inertial forces can be thought of as "internal attraction force" vectors facing toward axis 05. As the direction of the vectors changes with the rotation of the system, they act internally on the system.

In the case where the mass of the particles Mc<Md, the pair of inertial forces are +/–Fd, on the left and right. These inertial forces can be considered "inertial repulsion forces" that repel each other. As the direction of the vectors changes with the rotation of the system, they act internally on the system.

Since the center of gravity of the system is at axis 05, there is no action of centrifugal force on the system. However, inertial forces corresponding to $\kappa$, the deviation of the partial principal axis of inertia, and the mass (Mc+Md), act at axis 05 as previously explained with respect to FIG. 1.

The power required to keep this system of particles rotating at a constant velocity can be expressed as, $Pc=2Fd\,\kappa\omega=2 (Mc+Md)\kappa^2\omega^3$.

Under conditions of angular acceleration, if the initial angular velocity is $\omega 1$ and the angular acceleration is $\psi$, then the equation, $\omega=(\omega 1+\psi t)$, can be substituted into the above equation, and the required power can be calculated.

Note that when Mc=Md, the deviation of the principal axis of inertia κ=O, and the deviated force Fd=0. Therefore, the power Pc=0, in this situation.

Thus, the power loss due to the deviated force caused by the rotation of the system has been described with regard to the systems of particles described above based on FIG. 1 and FIG. 2.

Next, the theoretical background of a real type rotating body will be explained based on FIG. 3.

Figure 3:
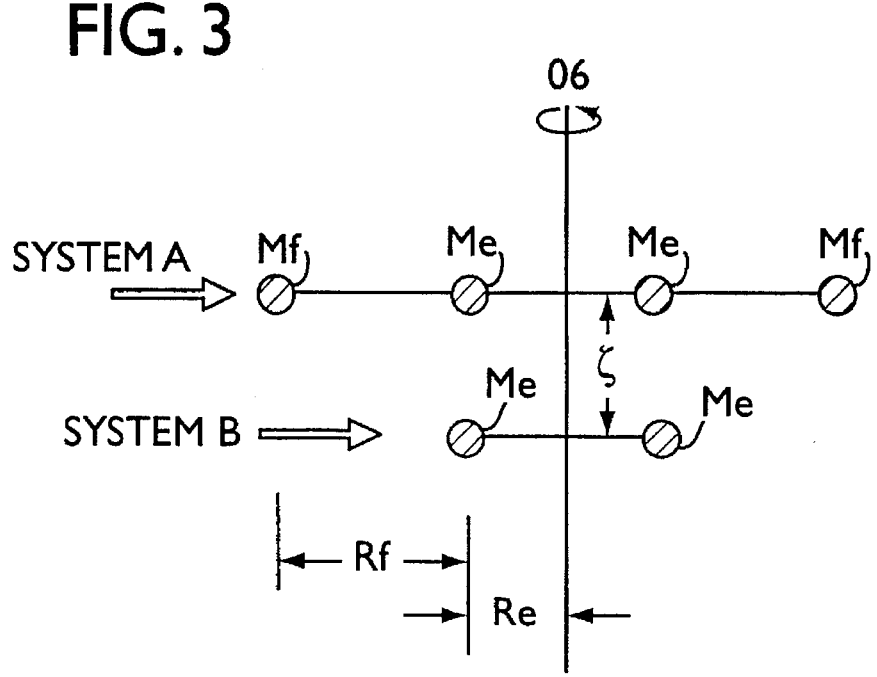
FIG. 3 is a drawing explaining the basic theory of this invention using a system of particles where six particles are attached to two rigid rods wherein the masses of the rigid rods can be ignored, and where system A is connected to system B by a rigid shaft that runs along axis 06.

The system of particles shown in FIG. 3 comprises a system A, made up of a pair each of particles Me and Mf, located symmetrically with respect to axis 06, and a system B, which is separated from system A by a distance ξ, and which is made up of a pair of particles Me positioned symmetrically around axis 06. Particles Me and particles Mf are relatively positioned so that they are orthogonal to the axis 06.

Systems A and B are joined together by a rigid rod, the mass of which can be neglected, that runs along axis 06.

For this system of particles, the mass of the particles is defined so that 2Me=Mf. The deviation of the axis of center of gravity ε=O, and the deviation of the principal axis of inertia κ=O.

When an angular acceleration, ψ, is applied to the system, a torque caused by the difference between the moment of inertia of system A and the moment of inertia of system B occurs, and can be expressed by the equation, s=2Mf (Re+Rf)²ψ. This is a characteristic difference between the ideal type and the real type systems.

The torque or twisting force, acts between system A and system B which are separated by the distance ξ. If the system of particles is considered to be rigid, however, this force does not contribute to power loss.

The rotating body of an actual machine is not perfectly rigid, and therefore torque does contribute to some power loss. However, the power loss due to the aforementioned twisting force is extremely small, and can generally be neglected.

In all of the foregoing mass systems, geometrical points have been assumed to have mass, and from a dynamic aspect this is the most abstract way to look at a body. Also, the system of particles has addressed multiple particles as one set.

Below, a rotating body, according to the instant invention, will be explained as being a continuous body made up of an infinite number of particles.

Figure 4:
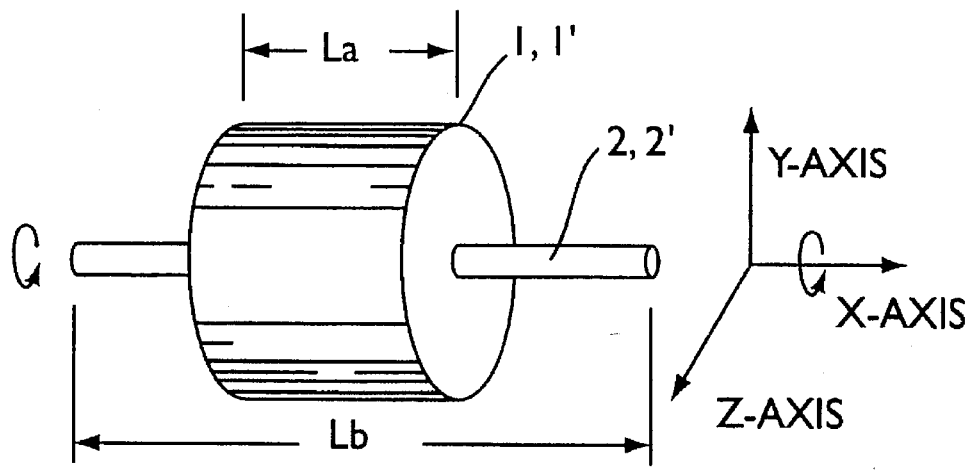
FIG. 4 is a pictorial view showing an inner rotor of an embodiment of the instant invention, and explains the basic configuration of this embodiment.

A first embodiment of the present invention addresses an ideal type and a real type inner-rotor type rotor of an electric motor. FIG. 4 shows the most basic form of such a rotor. FIG. 4 shows an ideal type solid inner rotor of an electric motor, where the cylindrical rotor 1 and rotor shaft 2 are made of materials having the same density, and where the rotor shaft 2 is fixed to the center of the cylindrical rotor 1. Alternatively, both the rotor and rotor shaft may be integrally made as one piece of material having a uniform density.

Rotor 1 can be used as the rotor in a generator, if it is magnetized. The basic form shown in FIG. 4 can also be used as an ideal type flywheel.

Additionally, FIG. 4 shows another basic form, which is a real type solid inner rotor having a rotor 1' with a material density ρa and a width La along the X-axis. A rotor shaft 2', is formed from a material having a density of ρb, and a width Lb along the X-axis. This form satisfies the equation ρa*La=ρb*Lb. The materials for forming the rotor shaft 2' are not limited to metals, but may be ceramics or composites, for example.

Referring back to the first form (ideal type rotor), shown in FIG. 4, the X-axis is the center of rotation. In any arbitrary YZ plane that crosses the X-axis, the mass distribution of that plane is such that the deviation of the principal axis of inertia is essentially zero.

This will be explained in more detail using FIG. 5. Referring to FIG. 5, at an arbitrary point along the X-axis 3 of the ideal type rotor, a fan-shaped radial sector 4 having a very small thickness and radius Rg can be defined. The partial axis of center of gravity of this sector Gr5 is located at a position $\{Rg(2^{1/2})/2\}$ from the X-axis 3.

When the area of this sector is equally divided by the radial arc $\{Rg(2^{1/2})/2\}$, the distances from the partial axis of center of gravity Gr 5 to the points in each division where the moment is applied, are Lc and Ld, and they are equal and are expressed as $(2^{1/2}-1)(Rg/2)$. Thus, the points where the moment force acts when the sector is divided equally by the partial axis of center of gravity are Lc and Ld, respectively.

The partial principal axis of inertia Fr 6, which coincides with the product of the squares of masses and distances of the pair of radial sectors equally divided by the axis of center of gravity Gr 5, is located at a position $\{Rg(2^{1/2})/2\}$. In other words, the positions of both Gr5 and Fr6 match.

Even if these equally divided sectors are divided again into two sectors of equal mass, or are repeatedly divided, the positions of Gr and Fr of the divided portions will match.

Accordingly, for this example, the deviation of the principal axis of inertia κ=0. In other words, there is no deviation of the principal axis of inertia anywhere in the rotor.

In the case of a rotating body such as a sphere, disk, or hollow cylinder, where one of the axes of center of gravity and one of the principal axes of inertia are matching at an axis, which is the center of rotation, as described in the case of the ideal type rotor, the deviation of the principal axis of inertia κ=0.

In the real type rotor example, a cylindrical rotor 1' and a rotor 2' are made of materials having differing densities. Accordingly, the partial axis of center of gravity Gr and the partial principal axis of inertia Fr do not match along the portion where these components fit together.

However, if a section is taken which covers the total area (thickness) of a YZ plane which crosses the X-axis, the partial axis of center of gravity Gr and partial principal axis of inertia Fr match, and Gr and Fr match for any further divided sections as well. Therefore, in this case, the deviation of the principal axis of inertia κ=0.

In the section of the real type rotor, where the cylindrical rotor 1' and rotor shaft 2' come together, there is a "twisting force" (torque), which corresponds to the angular acceleration, between the rotor and the shaft due to the change in load.

FIG. 6 shows a section having a small angle δ in the YZ plane of a hollow cylindrical shaft 7 and ring 8, whose center of rotation is the X-axis, where the masses of the portions of shaft 7 and ring 8 are equal.

The cylindrical shaft 7 has a thickness Wa, outer radius Rh, and density ρc, and the ring 8 has a thickness Wb, outer radius Ri, and density ρd. It is possible to make the deviation of the principal axis of inertia κ=0, by satisfying the equation: ρc (2Rh–Wa) Wa=ρd (2Ri–Wb) Wb, for equal masses of the shaft and ring. This embodiment can also be applied to a sealed turbine blade having a shroud ring 25 such as in the embodiment shown in FIG. 17.

However, it is not possible to remove the deviation of the principal axis of inertia κ from all rotating bodies by only theoretical means. For example, tires and wheels of a vehicle on a road are related to each other by their purpose or function, and generally a testing stage is necessary. Also, in the design and evaluation process, it is necessary to have a means of measuring the deviation of the principal axis of inertia.

There are two types of methods for measuring the deviation of the principal axis of inertia, depending on the type of rotating body. One method applies to a rotor or gear of an electric motor or generator that rotates around a fixed axis of rotation (this will be called the rotating type), and the other method applies to a rotating body, such as the connecting rod of a reciprocating engine, that has cyclic rocking motion (this will be called the cyclic type).

In contrast to the systems of discrete particles described above, a rotating body can be considered to be a continuous body made up of an infinite number of particles. The deviation of the principal axis of inertia $\eta$ is then described as the total of an infinite number of deviations of principal axes of inertia $\kappa$ in the rotating body, and can be thought of as acting on an axis of center of gravity that is parallel to the center axis of rotation of the rotating body.

In measuring the deviation of the principal axis of inertia $\eta$, of a rotating-type rotating body by the first method, the change in the number of rotations Na occurring during time t, due to losses, such as friction loss in a bearing, of an ideal type rotating body which resembles the rotating body and whose $\kappa=0$, is measured.

Next, the rotating body to be measured is used in the same bearing, and the change in the number of rotations Nb for an equal period of time t is measured. Na is then subtracted from Nb, and the result is divided by time t to find the number of rotations N per second.

In order to negate the effects of air resistance, rotating bodies having vanes or blades, should be measured in a vacuum. If the mass of the rotating body to be measured is M, the length from the center of the rotating shaft to the partial axis of center of gravity of the fan-shaped sector is R, the number of rotations per second is N, the change in the angular velocity over the same time t is $\omega$, and the circular constant is $\pi$; the amount of work due to the deviated force caused by $\eta$ is equal to the change in kinetic energy and leads to the equation, $M \eta^2 \omega^2 (2\pi N) - (\frac{1}{2}) M R^2 \omega^2$.

Here, $\eta$ can be found from the equation, $\eta = R/(4\pi N)^{1/2}$. However, if the length R is not a uniform value, an average value for R must be calculated.

The second method, used for measuring a cyclic-type rotating body, measures the period of a small natural oscillation. The center of the rocking motion is considered to be the suspended center of the measured cycle.

Also, similar to the first method, the second method considers that there are an infinite number of deviations of principal axes of inertia $\kappa$ acting on an infinite number of different points in the body, wherein the body is a connecting rod, for example.

If the mass of the connecting rod is M, the distance from the suspended center to the center of gravity of the rod (excluding the small end) is $\iota$, the acceleration due to gravity is G, the circular constant is $\pi$, the angular acceleration of the small natural oscillation is $\psi(rad/sec^2)$, and the small angle of the natural oscillation is $\theta(rad)$, then from the torque acting on the center of gravity of the rod and the concept of the center of oscillation leads to the equation $M (\iota+\eta)^2 \psi = -MG (\iota+\eta)\theta$.

In this case, the natural oscillation can be regarded dynamically as being simple harmonic motion.

The square of the period, $T^2$, is expressed by the equation, $T^2 = 4\pi^2 ((\iota+\eta)/G$, and the deviation of the principal axis of inertia $\eta$, as seen from the center of gravity of the rod can be measured as, $\eta = [(T^2 G)/(4\pi^2)] - \iota$.

Figure 7:
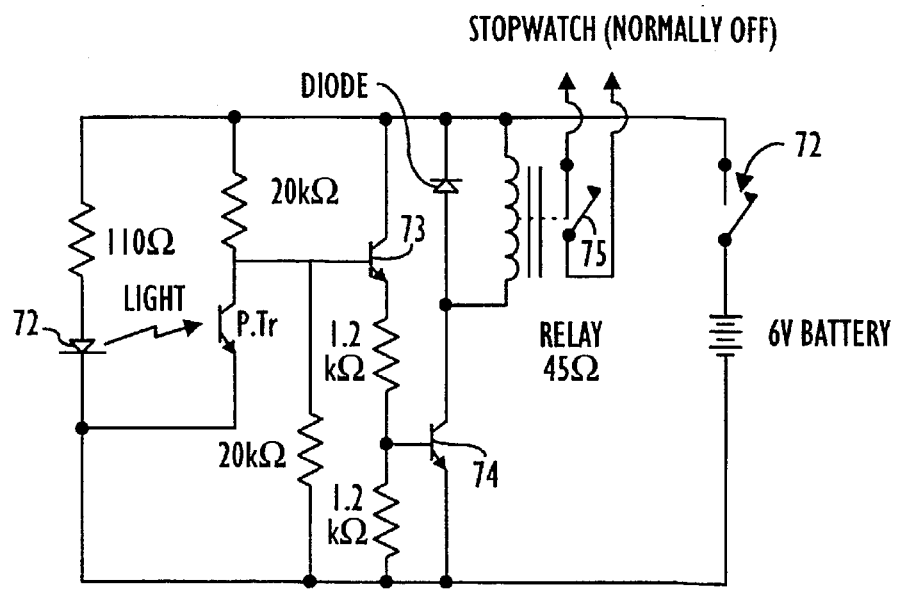
FIG. 7 is an electrical circuit diagram of a device used in measuring the period of a rotating body of the instant invention.
Figure 8:
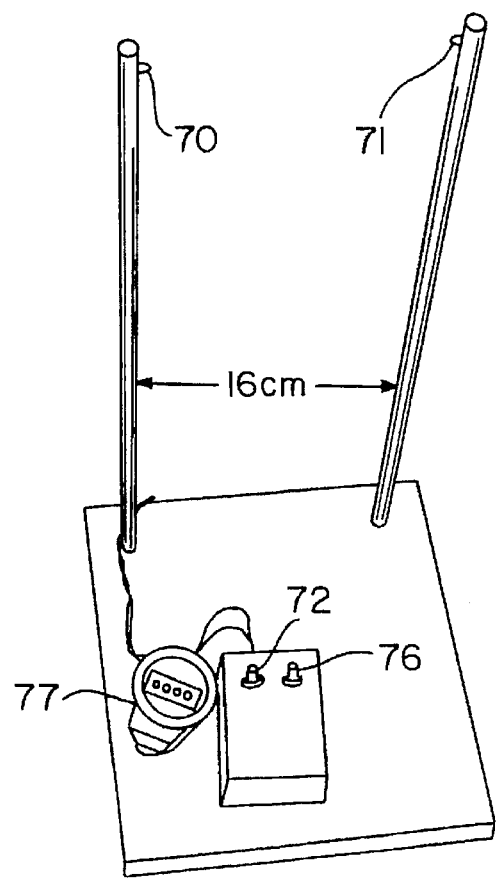
FIG. 8 is a pictorial view of a device used in measuring the period of a rotating body according to the instant invention.

Measurement of the period of this embodiment was performed using an electronic period measuring device, as shown in FIG. 7 and FIG. 8, which comprises a light emitting diode (LED) 70 (e.g., Toshiba TN—601A) as the light emitting element, and a photo transistor (P.Tr) 71 (e.g., Toshiba TSP601A) as the light receiving element. The device is capable of measurement with a degree of error of +/−1/10,000 sec or less for a body with a period of 1 sec or more.

The measurement device, shown in FIG. 8, operates as follows: when the power switch 72 is pressed, light is emitted from the LED 70. When the light is blocked is by the body to be measured, the current in the photo transistor 71 is cut OFF. This turns ON (Tr2) 73 (e.g., NEC C922) and (Tr3) 74 (e.g., Sony C756), and the current that flows activates a relay. The activated relay moves a switch 75 and the electronic stopwatch 77 (e.g., stopwatch provided by Maruman) begins to measure time.

After 10 oscillations, the power switch 72 is again pressed, and when the body being measured once again blocks the light, the relay is activated again and the stopwatch is stopped. Accordingly, the time for 10 cycles has been measured. The stopwatch is reset by pressing reset button 76.

Generally, application of a prior art balancing technique to known multi-cylinder reciprocating engines was performed around the rotating axis of the crankshaft. However, the inertial force caused by the deviation of the principal axis of inertia $\eta$ of the crankshaft and connecting rod, acts on the center of the rocking motion of the connecting rod, and this is considered to be the cause of mechanical vibrations and heat loss.

From present theory, and also from test results, the theory regarding the period of a physical pendulum (actual pendulum or compound pendulum) as described by former dynamics, can be shown to be in error. When a torque Tq is applied to a general body, the moment of inertia of the body is J, and the angular acceleration of the body is $\psi$, the equation $J\psi = -Tq$, can be derived.

A body for which the equation $J\psi = -Tq$ holds true, is an ideal situation such as a special shaped body, for example, a rod the diameter of which can be ignored, a cylinder, a hollow cylinder, or a sphere. The following conditions must also be met: a deviation of axis of center of gravity $\epsilon = 0$, and a deviation of principal axis of inertia $\kappa = 0$, and these conditions are satisfied in an axis of center of gravity. Also the torque Tq must be applied perpendicularly to the axis of center of gravity of the body.

The theoretical background for this has already been explained. Also, in the bodies of all cases, the pendulum theory was applied, and it is not possible to know the value of the moment of inertia of the body.

In tests, the measurement results of a connecting rod having mass of 836.6 g, showed that the period was 0.821 seconds when the distance from the suspended center to the center of gravity of the rod was $\iota_1 = 12.3$ cm, and 1.446 sec for $\iota_2 = 51.5$ cm.

If the pendulum theory is correct, the square of the radii of rotation around the center of gravity should be the same. However, in the measured tests the square of the radius corresponding to $\iota_1$ was 54.5 $cm^2$, and the square of the radius corresponding to $\iota_1$ was 20.8 $cm^2$. Also, the values of the moments of inertia of the rod were completely different, i.e., 46.5 g cm² and 17.7 g cm², respectively (the acceleration due to gravity was taken to be G=980 cm/sec²).

In the special case where the equation, J$\psi$=−Tq holds, $\eta$=0) in the aforementioned equation, $T^2=4\pi^2$ ($\iota+\eta$)/G, and this is the same as the equation describing measurement of the period of a harmonic pendulum.

When the radii of rotation around the center of gravity are zero for the special case, the special body can be modeled the same as the model for cyclic motion of a particle. In other words, the law of conservation of angular momentum is satisfied for the rotation, where the axis of rotation of the body is the axis of center of gravity with $\epsilon$=0 and $\kappa$=0.

The above test measurements showed that the former physical pendulum theory is not correct, and that even for a rotating-type rotating body, it is possible to know the value of the deviation of the principal axis of inertia $\eta$, from measuring the period.

Next, the preferred embodiments of the invention are described with reference to the drawings.

The rotating body shown in FIG. 4 is an inner rotor, which has already been described. When the basic shape of the aforementioned inner rotor is applied to a flywheel, the materials used for the cylindrical rotor 1 and the rotor shaft 2 have the same density. In the area where the cylindrical rotor 1 and rotor shaft 2 fit together, it is necessary that the junction is formed so that no inertial force, including centrifugal force, occurs.

This requirement excludes the commonly used method, for example, of employing a wedge type fitting.

The embodiment shown in FIG. 9 is another form of an ideal type inner rotor used in an electric motor or generator. Each of the two rod-shaped rotating rotor shafts 9, has one disk shaped end, and the shafts 9 are aligned with the rotor 10, which has partially fan-shaped protruding sections, so that the center of the axis of rotation of the rotor 10 and rotor shafts 9 are matched. The two shafts 9 are attached to the end surfaces of the rotor 10, at the center of the axis of rotation, via the disk shaped ends, using an adhesive.

The shafts 9 are made of a metal that has excellent mechanical strength and good friction properties, however, other materials such as ceramics or composites can be used. If a hard magnetic material is used for the material of the rotor 10 to make magnetic bands, this rotor could be used as the rotor for a basic form synchronous motor, stepping motor, or generator.

If the material of the rotor is a soft magnetic material, the rotor could be used as the rotor of an induction motor.

There is no need for the density of the material of the shafts 9 and the rotor 10 to be related, thus, they can be freely selected.

The embodiment shown in FIG. 10, shows an ideal type outer rotor.

The hollow cylindrical magnetic rotor 11 and the metallic rotor shaft 12, which has one end that is disk shaped, are joined together using an adhesive at the center of rotation. The rotor shaft 12 is attached to the center of the axis of rotation of the hollow, cylindrical outer rotor 11 on one side thereof.

In regards to the material, construction of parts, or usage, this rotor is the same as the ideal type inner rotor described above.

Figure 11A:
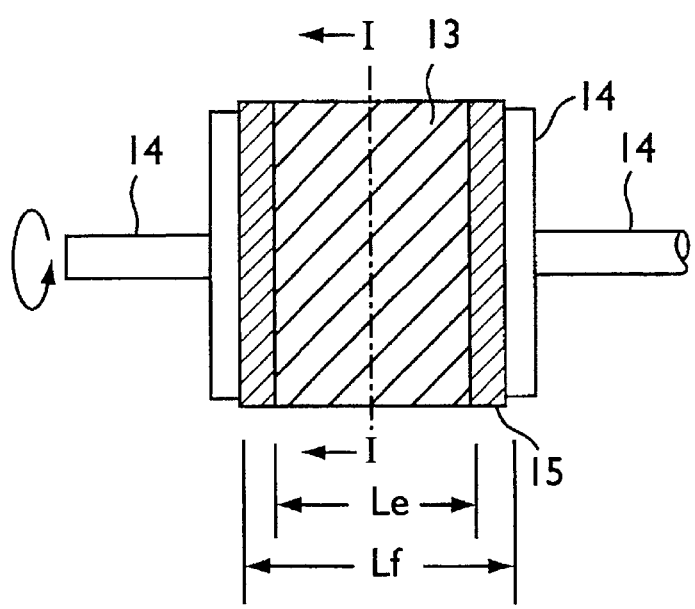
FIG. 11 (a) is a side view and FIG. 11 (b) is a front view showing a real type cage rotor of an embodiment of the instant invention.
Figure 11B:
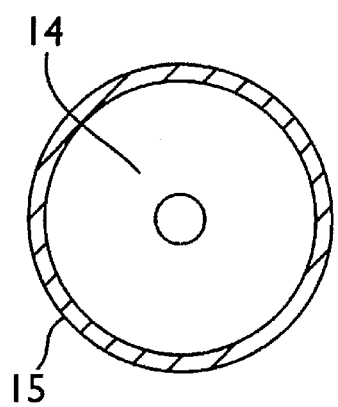
Figure 12:
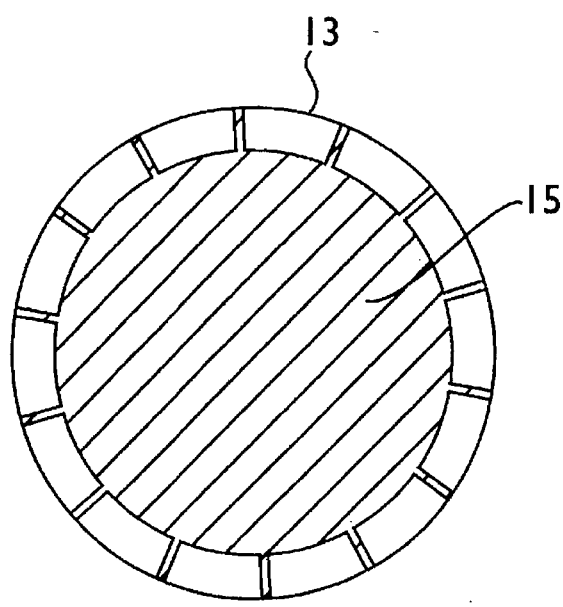
FIG. 12 is a cross-sectional view taken along line I—I in FIG. 11 (a), of the real type cage rotor of an embodiment according to the present invention shown in the side view (a) of FIG. 11.

The embodiment shown in FIGS. 11 and 12 shows a real type cage rotor for an induction motor. This rotor can also be used in a synchronous motor. The rotor portion comprises a conductive main rotor section 15, preferably made of precision casting aluminum die cast (having density $\rho e$), and fan-shaped rotor sections 13, preferably made of soft magnetic material (having density $\rho f$) which are attached to the main portion of the rotor 15 using an adhesive.

Two rotor shafts 14, having the same shape as those in the embodiments of the ideal type inner rotor and outer rotor described above, are joined to the main rotor section 15 at the center of the axis of rotation using an adhesive.

FIG. 12 is a cross-sectional view taken along line I—I of the cage rotor shown in FIG. 11. The aforementioned rotor sections 13, as shown in the cross section, have a partial fan shape. The fan-shaped rotor sections 13 have a width Le, and the main rotor portion 15 has a width Lf, such that the equation, $\rho e*Le=\rho f*Lf$, is satisfied. Accordingly, no deviated force, due to the deviation of the principal axis of inertia, will act on this rotor. Thus, an embodiment of the instant invention relating to the rotor of a generator or electric motor has been described above.

Using a 4-pole ac motor, which is used in most household appliances, as an example, the efficiency was 40 to 50%, and the improvement of efficiency due to the instant invention was approximately 3%.

As a further example, for a 307 g rotor of a single-phase ac motor, the results of measurement showed that the power lost for a deviation of the principal axis of inertia of 1.6 mm, and operating rpm of 1,500 rpm, was 0.317 watts. The effective output of electric motor is 8 watts, and by incorporating the instant invention, an improvement of power of 0.31 watts was possible, with the improvement in efficiency being (0.31×100)/8=3.8%. Thus, in small, low rpm electric motor, power losses are less significant than in higher power devices.

Further, in electric motors that have external loads that vary greatly, such as those use in industrial machinery, the power lost due to angular velocity caused by the deviation of the principal axis of inertia, is rather large, and it also becomes impossible to neglect the problem of heat generated corresponding to the power lost.

An example where the problem of heat generation becomes more serious than the problem of power loss, is in a permanent magnet stepping motor. The angle of rotation of the rotor of this kind of stepping motor, is controlled by the number of input pulses input to the drive circuit, and the speed of rotation is controlled by the pulse frequency.

The frequency response for this input pulse is generally between 200 to 10,000 pps (pulses per sec). Since the response velocity is high, the generated heat corresponding to the power loss caused by the deviation of the principal axis of inertia has a large effect on the reliability of the stepping motor.

According to the repair data of Nippon Electric Co., Ltd., (NEC), the failure rate of printing mechanisms due to stepping motors, which are widely used in the printing mechanisms of commercially sold small computers or word processors, is about 44.7%, and most of the failures are due to damage caused by heat generation. This problem is stated as the single most important problem to be solved, for increasing the reliability and durability of these printers.

Another example where the effects of the present invention are very notable, is in an application to an electric motor that is used as the prime mover of an electric automobile. For such a use, it is important to make the motor as light as possible. Also the motor, must be capable of operating at high speeds exceeding 3,000 rpm.

FIG. 13, shows an embodiment of an ideal type pulley that transmits power by way of a belt. The rotating shaft 16 and pulley 17 are made of materials having the same density, and are both securely fastened together, or are made as a single piece.

The outer diameter of the area where the shaft 16 fits in the pulley 17 is made larger, or this area is specially designed so that it is strong enough to correspond to the anticipated load.

As noted above, the pulley shown in FIG. 13 can be made as a single piece, using precision casting or machine cutting.

The method used for attaching the pulley 17 to the rotating shaft 16 does not include methods that would cause inertial force, including centrifugal force to occur. Appropriate methods of attachment were previously explained with regard to the flywheel embodiment.

The pulleys, gears, cam shafts, eccentric rotors, and crankshafts according to the present invention, show the real effects of the invention basically in the same way as do the generator or electric motor described above.

Especially in the reduction gear and pulley of a gas turbine of a high-speed rotating generator with operating speeds exceeding 40,000 rpm, and in the cam shaft and pulley of a reciprocating engine with operating speeds exceeding 3,000 rpm, the effects of this invention on the reduction of power loss of the machine is expected to be great.

FIG. 14 shows a pictorial view of a real type spur gear embodiment. A dummy gear 19 and spur gear 20 are attached to a rotating shaft 18. All three of these components are made of materials having the same density. The construction is real type because of the addition of the dummy gear 19.

The spur gear and dummy gear are precision cast and hardened using heat treatment.

Reasons for using the dummy gear are that it also becomes possible to use it for a cam shaft, and/or a flywheel of a reciprocating engine. However, the intention of this invention has been made clear by previous explanations, and a detailed explanation will be omitted.

Figure 15:
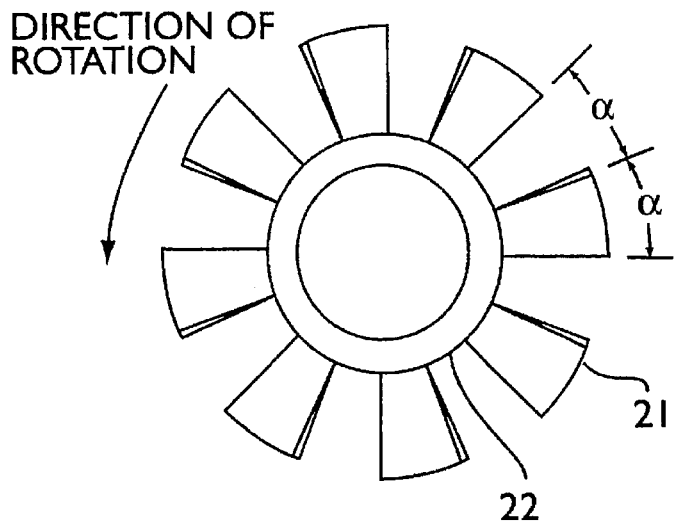
FIG. 15 is a partial front view showing an ideal type turbine of an embodiment according to the instant invention.

FIG. 15 shows the basic construction of one ideal type turbine that is to be used in combination with several of the same.

The eight blades 21 are sectors having an axis at the center of rotation of the hollow cylindrical shaft 22 and are partial sectors having the center cut out. Cylindrical shaft 22 has an outer radius R. The blades 21 are formed with the hollow cylindrical shaft 22 as a single piece.

However, if the materials of both the blades and the shaft have the same density, it is also possible to construct the turbine with blades that are slide on the shaft from the side. The angle $\alpha$ between blades shown in FIG. 15 is about 22.5 degrees. Multiples blades 21 are used, but the total number of the same can be odd or even.

This kind of ideal type turbine, is generally used at high speeds, having an operating speed of tens of thousands of rpm. Not only does the present invention lessen the inertial force caused by the deviation of the principal axis of inertia and reduce the power loss, but it also contributes greatly to the reducing the strength requirements for design of the turbine blades.

Figures 16A, 16B:
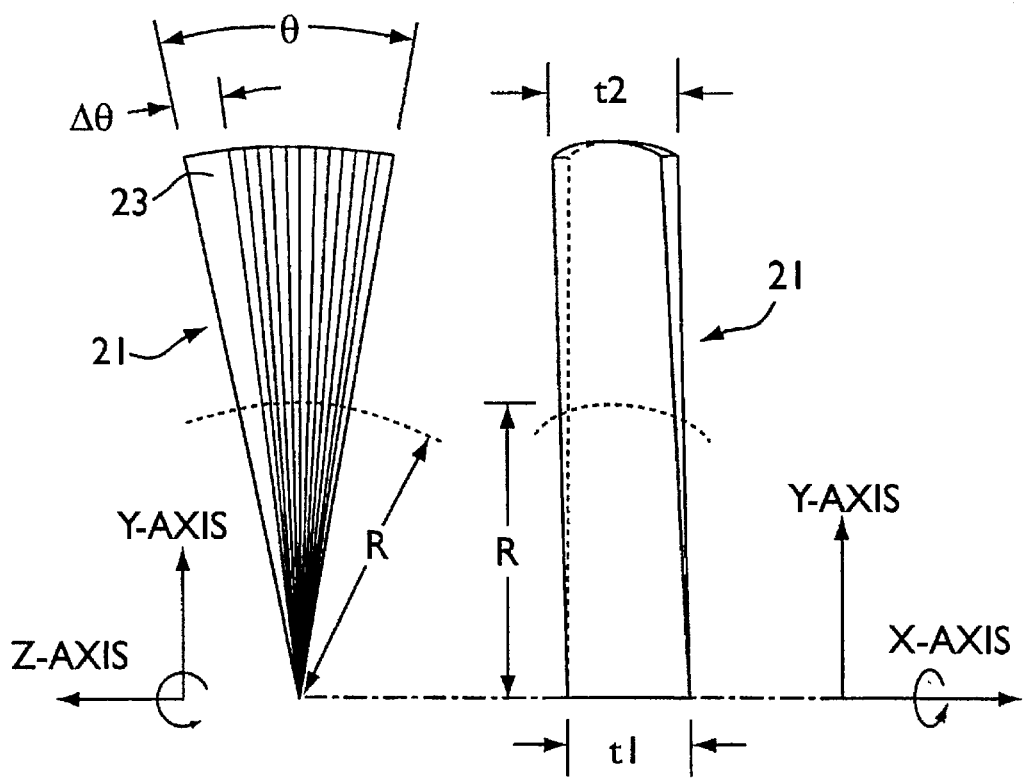
FIG. 16 (a) is a front view and FIG. 16 (b) is a side view used to explain the shape of the blades of an ideal type turbine of an embodiment according to the instant invention.

FIG. 16 (a) shows a preferred shape of a blade 21. The blade is constructed by placing several small angle, fan-shaped, sector blades 23 with uniform thickness $\Delta\theta$, on top of each other until the total angle, $\theta$, is 22.5 degrees. The blade has a radius R in the center that corresponds to the outer radius of the hollow cylindrical shaft 22.

In the case of blades 21, the thickness at the base of the blade 21 at the center of rotation on the X-axis, t1, and the thickness of the blade tip, t2, are the same.

However, the small angle, sector blades with uniform thickness $\Delta\theta$, can be made so that the thickness of the blade increases as it gets nearer to the center of rotation on the X-axis, and so t1>t2.

Figure 17:
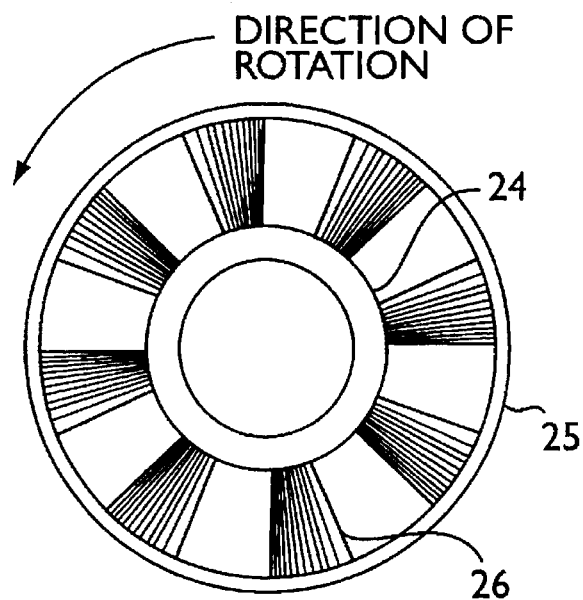
FIG. 17 is a partial front view showing ideal type turbine blades with a shroud ring attached according to an embodiment of the instant invention.

The embodiment shown in the front view of FIG. 17 is one ideal type turbine, to be used with several, and an ideal type shroud ring. Around the outer circumference of the blades 26 is a type of duct that is generally called a shroud ring 25, which creates a very efficient, enclosed, axial-flow-type turbine.

As is shown in FIG. 6, if the thickness of the hollow cylindrical shaft 24 is Wa, and its outer radius is Rh, and the thickness of the shroud ring 25 is Wb, and its outer radius is Ri, then the equation, (2Rh−Wa) Wa=(2Ri−Wb) Wb, can be satisfied. In this case, the hollow cylindrical shaft 24, shroud ring 25, and the eight blades 26 are all made of materials having the same density.

In a turbine with a shroud ring according to the prior art, the shroud ring receives the action of the inertial force when the turbine rotates at high speed, and becomes deformed or damaged. Accordingly, the prior art device was mainly used in low-speed devices such as an industrial blower, for example.

The present invention makes it possible to use an enclosed type of turbine in high-speed turbines, compressors, or fans, and makes it possible to greatly improve the efficiency thereof.

The two embodiments of the invention shown in FIG. 15 and FIG. 17 are basic forms, and can be applied in turbines, as well as aircraft propellers, ship screws, or as rotor blades or rotor vanes in axial-flow blowers and compressors.

Figure 18A:
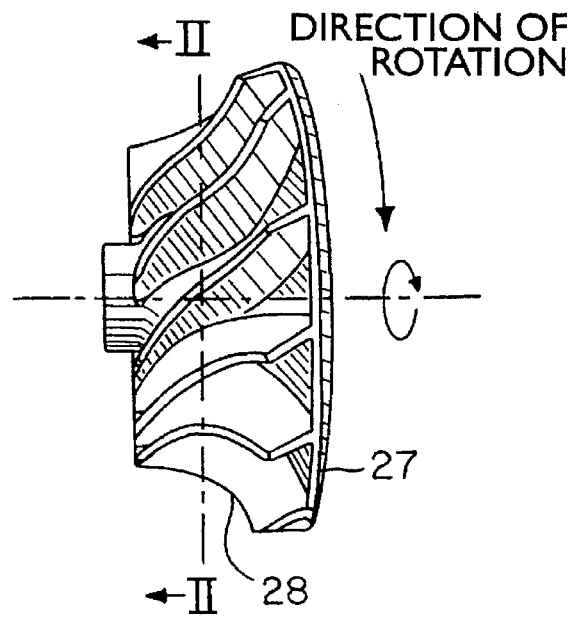
FIG. 18 (a) is a side view and FIG. 18 (b) is a cross-sectional view taken along line II—II of the side view in FIG. 18 (a), and showing an ideal type compressor impeller of an embodiment according to the present invention.

The embodiment shown FIG. 18 is an ideal type centrifugal compressor impeller used for example in a turbo charger of an automobile. This compressor impeller is made by precision casting, and is called a backward type, since the blades curve in a direction opposite the direction of rotation.

The air-flow characteristics of the fan-shaped impeller blades 28 exhibit many advantages over radial-type straight blades. For example, the fan-shaped impeller blades 28 output a more uniform air current than the radial-type straight blades, and at a higher efficiency, even when the amount of air flow is small.

Figure 18B:
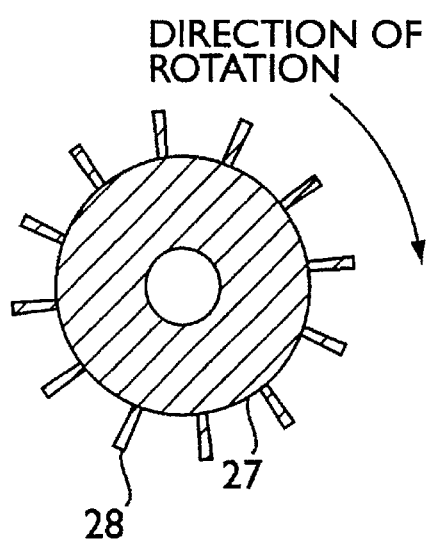

The construction of the backward type impeller blades is difficult to accomplish, however. Accordingly, the present invention may also be applied to radial type blades having simpler construction (see FIG. 26). FIG. 18(b) shows a cross-sectional view taken along line II—II of FIG. 18(a), and shows the shape of the impeller blades 28 and impeller hub 27.

The shape of the cross-section of these impeller blades 28 is a partial sector. The basic form of this ideal type centrifugal compressor impeller can also be used in gas turbines, which are widely used in thermo power plants. By using a shroud ring, as described above, it is also possible to make an efficient enclosed type of impeller and greatly improve the heat efficiency.

Figure 19:
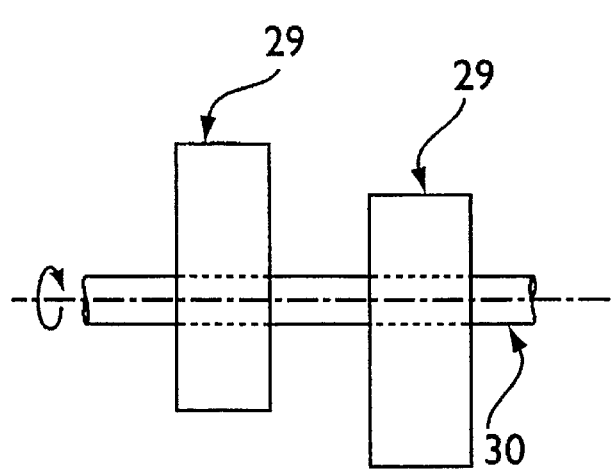
FIG. 19 (a) is a side view and FIG. 19 (b) is a front view showing an eccentric rotor of an embodiment according to the present invention.
Figure 19:
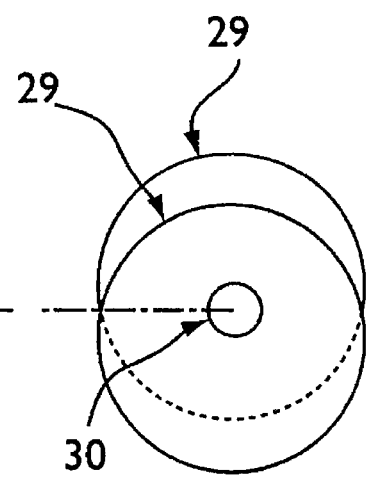

FIG. 19 shows an embodiment of a crankshaft, according to the present invention, of a reciprocating compressor which has multiple eccentric rotors.

The center of gravity of the two rotors 29 are located 180 degrees relative to each other on the axis of rotation. The two rotors 29 fit around and are secured to the rotor shaft 30. The materials of the rotors 29 and rotor shaft 30 have the same density.

This crankshaft can be used in developmental applications in the basic mechanisms of Napier's Engine or Cary's Rotary Pump.

A configuration of two rotors 29 can also be selected where one rotor is used as a dummy rotor for balancing, as a means against the centrifugal force.

Figure 20A:
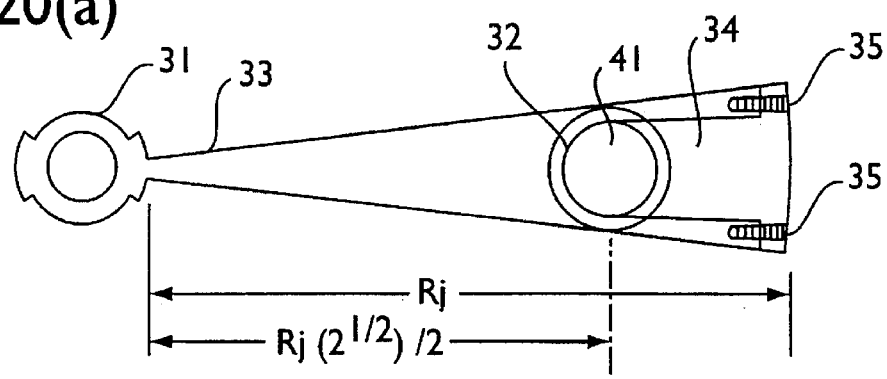
FIG. 20 (a) is a front view and FIG. 20 (b) is a side view of an ideal type connecting rod of an embodiment according to the instant invention.
Figure 20B:
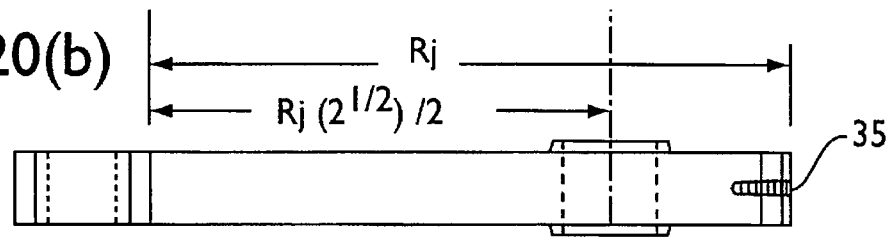
Figure 22:
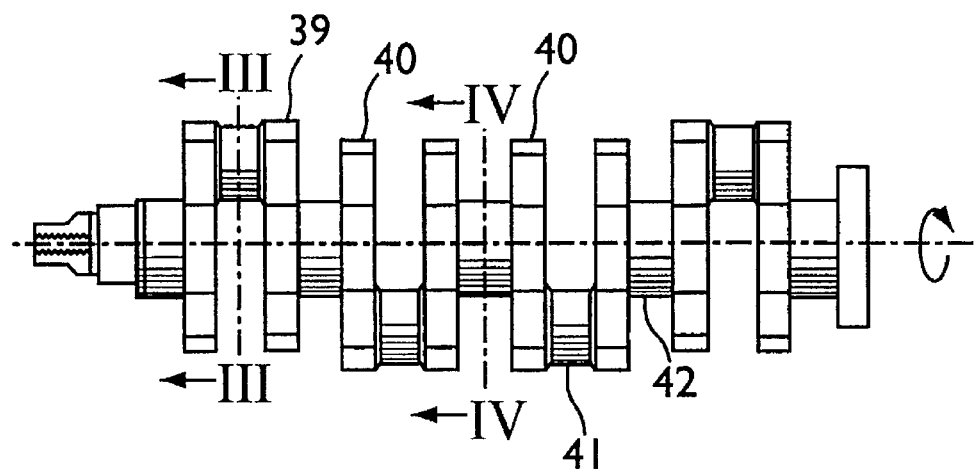
FIG. 22 is a side view of a 5-bearing crankshaft of an embodiment according to the present invention.
Figure 23A:
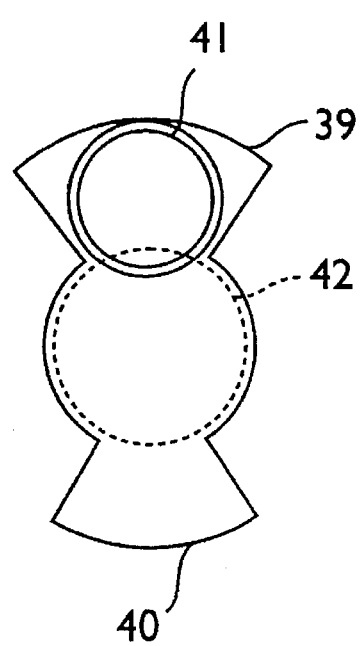
FIG. 23 (a) is a cross-sectional view taken along line III—III of FIG. 22 and FIG. 23 (b) is a cross-sectional view taken along line IV—IV of FIG. 22 showing a 5-bearing crankshaft of an embodiment according to the present invention.
Figure 23B:
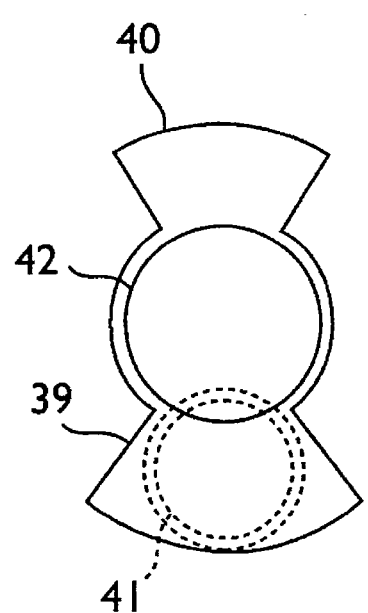

FIG. 20 shows an ideal type connecting rod embodiment, used in a multi-cylinder reciprocating engine, and it is used in combination with the crankshaft shown in FIG. 22 and FIG. 23.

In this embodiment, the small end 31 is the end which connects to the piston by way of the piston pin, and it has independent, ideal type construction.

This ideal type connecting rod comprises rod 33, rod 34, and two screws 35, where each of the parts is made of materials having the same density.

As shown in FIG. 20, if the small end 31 is removed or ignored, the center of the large end 32, which connects to the crank pin 41, is located at a position Rj $(2^{1/2})/2$, where Rj is the length of the fan-shaped sector which includes rod 33 and rod 34.

In this embodiment (ideal type connecting rod) it is not possible to completely make the deviation of the principal axis of inertia η=O. The reason for this was previously explained. Another reason is that due to the existence of the large end 32, it is not possible for the partial axes of center of gravity and partial principal axes of inertia to match when the rod is divided into small sections. Also, any connecting rod must be made so that it does not touch the inner wall of the cylinder during operation of the engine.

Figure 21A:
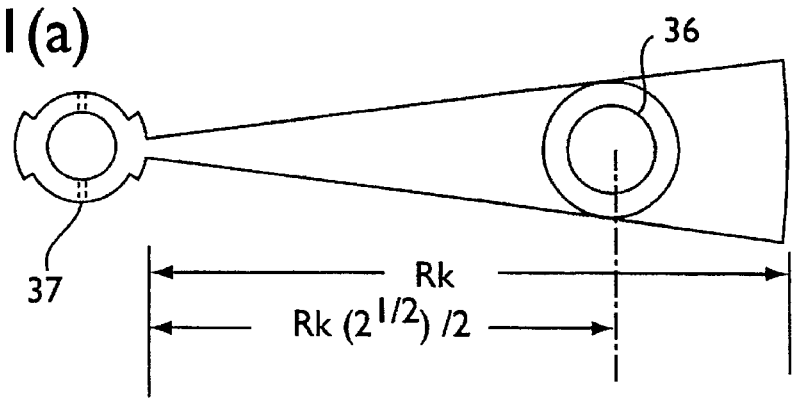
FIG. 21 (a) is a front view and FIG. 21 (b) is a side view of a real type connecting rod of an embodiment according to the present invention.
Figure 21B:
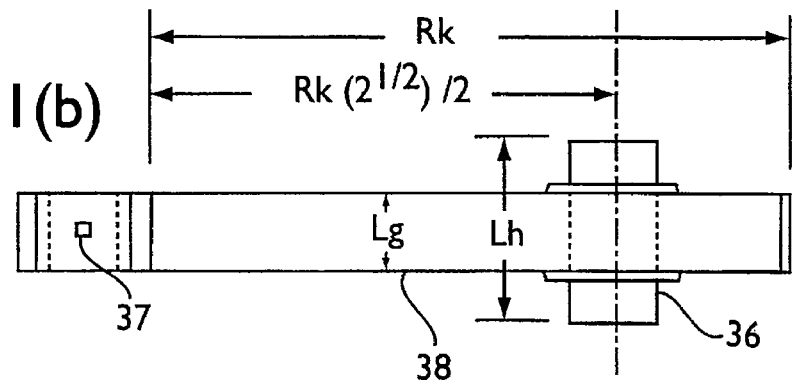

Different forms of this embodiment that are not are shown in FIG. 21 are possible. However, in order to reduce the deviation of the principal axis of inertia in the plane that is perpendicular to the center axis of the rocking motion, the basic form is a combination of circular and fan shapes.

The deviation of the principal axis of inertia η of connecting rods according to the prior art, was about 30 to 40 mm, for example, in the case of an 800 to 900 g connecting rod of a 4-cylinder gasoline engine. An 830 g ideal connecting rod according to the instant invention, as shown in FIG. 20, improves over the prior art by exhibiting a deviation of the principal axis of inertia of only about 3 mm.

The centrifugal force of the multiple connecting rods in a multi-cylinder reciprocating engine, as seen from the axis of rotation of the crankshaft, does not act on each individual connecting rod, because as previously explained, they are relatively placed so that they are balanced. For purposes of analysis, there is considered to be a couple moment caused by the dynamic unbalance.

The other inertial force caused by the deviation of the principal axis of inertia is considered in the vibration in the rocking of each individual connecting rod, and if the angular velocity of the crankshaft is ω, then the average angular velocity of the connecting rod can be expressed as being ω/$(2^{1/2})$.

The power loss due to the rocking motion of the ideal type connecting rod can be expressed by the equation, La=(M/G) $\eta^2[\omega/(2^{1/2})]^3/735.5$.

In more detail, if η=0.003, and the angular velocity ω=200 π (rad/sec) when the engine is operating at 6,000 rpm, where π is the circular constant, the acceleration due to gravity G=9.8 m/sec$^2$, and 1PS=735.5 watts, then La is 0.09 PS.

The total power loss for four ideal type connecting rods is four times La (calculated above), and is only 0.36 PS.

For the same conditions, if η=35 mm, then the power loss would be 45.9 PS. Accordingly, the effects of the present invention on improving this area of technology are extremely noticeable and significant.

Figure 24:
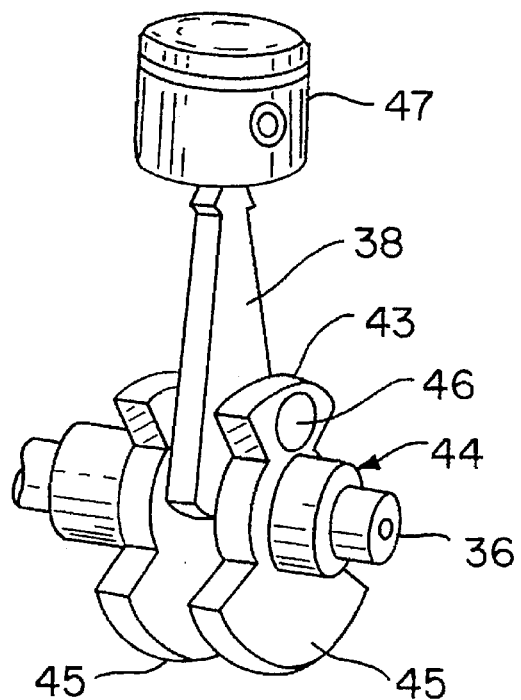
FIG. 24 is a pictorial view showing a real type single-cylinder crankshaft of an embodiment according to the present invention.
Figure 25:
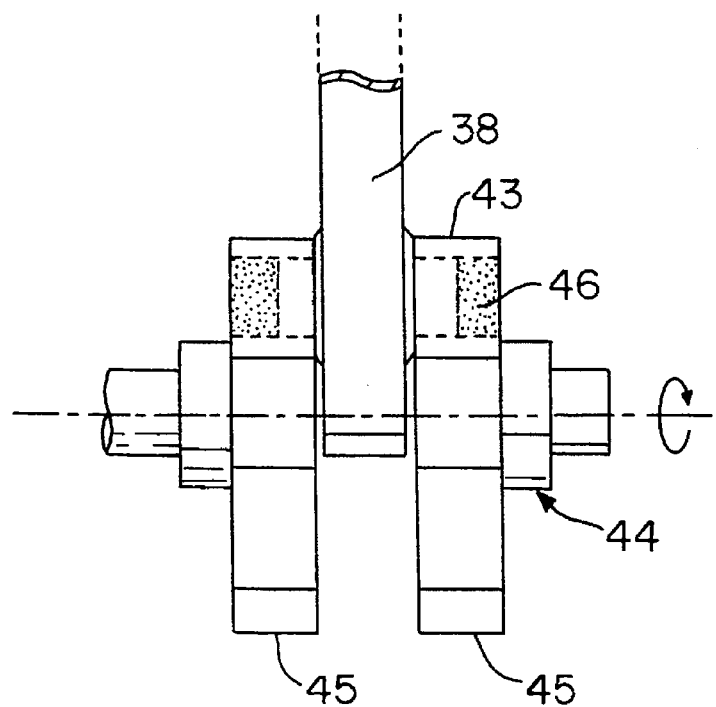
FIG. 25 is a side view showing a real type single-cylinder crankshaft of an embodiment according to the present invention.

The embodiment shown in FIG. 21 is a real type connecting rod for a single-cylinder reciprocating engine that corresponds to the crankshaft 44 shown in FIG. 24 and FIG. 25. For this real type connecting rod, if the length of the fan-shaped part of the connecting rod 38 is Rk, then the position of the center of the crank pin 36, where the connecting rod connects to the crankshaft 44, is Rk $(2^{1/2})/2$. The connecting rod 38 connects to piston 47 at the other end.

If the connecting rod is constructed so that the density of the connecting rod 38 is ρg and its thickness is Lg, and the density of the crank pin 36 is ρh and its length is Lh, so that the equation, Lg* ρg=Lh* ρh, is satisfied, then it is possible to essentially make the deviation of the principal axis of inertia zero.

In the case of this real type connecting rod, if a small increase in the deviation of the principal axis of inertia is considered due to the protruding section of the connecting rod 38, then the position where the rod fits with the crank pin 36 is not necessarily at Rk $(2^{1/2})/2$.

The effect of the rear type connecting rod of this invention, is nearly the same as that for the ideal type connecting rod described above.

Also, as shown in FIG. 21, although not required, it is advantageous if several fan-shaped oil holes 37 are located on the ideal and real type connecting rods.

FIG. 22 and FIG. 23 show an embodiment of a 5-bearing crankshaft made of materials having the same density. This crankshaft differs from the prior art in that the section of the crank arm 39 and balancing weight 40 are fan-shaped.

Various forms can be considered for the size of the balancing weight in this case, and in some cases balancing weight is not necessary at all. Accordingly, balancing weight is not an essential part of the present invention.

Generally, a prior art reciprocating engine has an efficiency of about 25%. By adopting the ideal connecting rods, 5-bearing crankshaft, cams shafts and pulleys according to the present invention, it is possible to greatly reduce the mechanical power losses, and provide a reciprocating engine that is close to the theoretical values for the Otto cycle thermal efficiency.

The embodiment shown in FIG. 24 and FIG. 25 is a crankshaft for a single-cylinder reciprocating engine. As noted above, crankshaft 44 can be used together with the real type connecting rod shown in FIG. 21. The crankshaft 44 is made as a pair of components which connect to the real type connecting rod via crank pin 36.

Weights 46 compensate for the mass which is voided by the hole in the crank arm 43 that connects to the crank pin 36 (i.e., the mass of the weights 46 corresponds to the mass of the material removed from the hole made in the crankshaft 44). The weights 46 may be made of lead alloys and may be attached by press fitting. Balancing weights 45 may also be provided to compensate for the mass of the connecting rod 38 and piston 47.

The power loss caused by the deviation of the principal axis of inertia in a single-cylinder reciprocating engine which uses the real type connecting rod and crankshaft of this invention can be assumed to be zero, and is essentially zero. However, as was the case with the prior art, it is not possible to eliminate the action of the centrifugal force caused by the deviation of the axis of the center of gravity due to the relation of the real type connecting rod and crankshaft.

Figure 26:
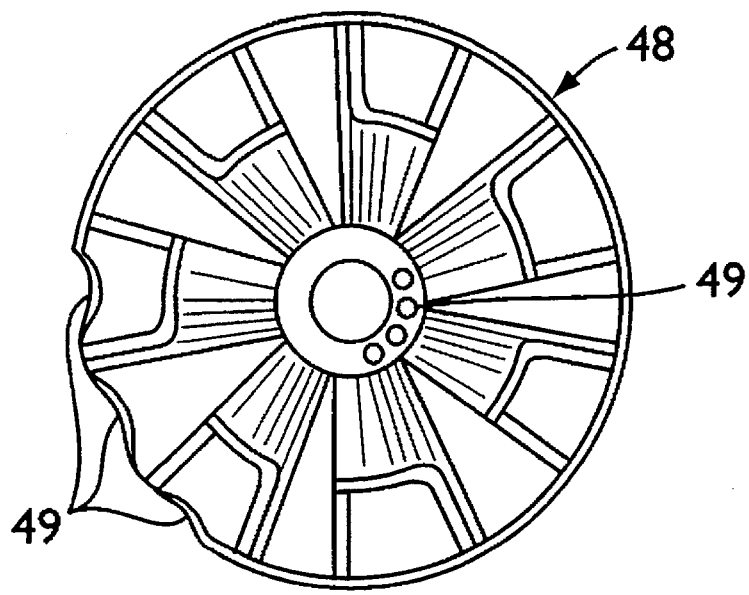
FIG. 26 is a drawing showing an adjustment method of performing dynamic balance of an unbalanced rotating body according to the prior art, for a radial impeller of a turbo charger of a gasoline engine.

FIG. 26 shows a radial impeller embodiment for use in a super charger for a gasoline engine. It shows the former method of adjusting the balance. Using a prior art method, a balancing machine is used to detect uneven mass distribution, and small holes 49 and/or cut-out sections 50 are used to adjust the balance.

However, the adjustment method intended by this invention for reducing the power loss, does not use these small holes 49, and, as shown in the ideal type compressor impeller of FIG. 18, it is better if the peripheral surface portion of the impeller hub 27 is cut out.

Figure 27A:
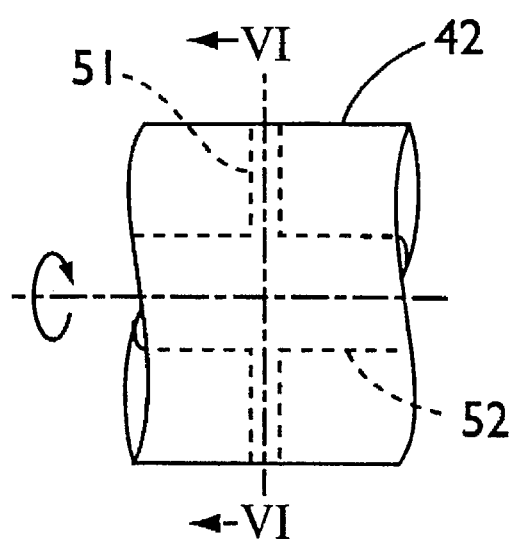
FIG. 27 (a) is an enlarged side view, and FIG. 27 (b) is an enlarged cross-sectional view taken along line VI—VI of FIG. 27 (a) of the journal section shown in the side view of FIG. 22, and shows the shape of the lubrication oil holes.
Figure 27B:
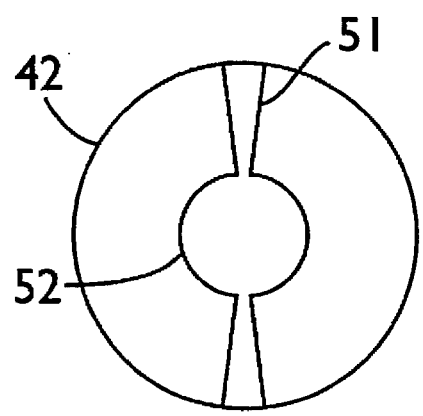

FIG. 27 is an enlarged view of the journal section 42 of the crankshaft shown in FIG. 22.

Power loss caused by the deviation of the principal axis of inertia is reduced by forming cylindrical oil holes 52 in the center of the journal 42, and supplying lubrication oil to the surface of the journal 42 by way of the fan-shaped oil holes 51.

The above explanation of the method of balancing a rotating body and the shape of the oil holes is intended also to apply to embodiments where it is not possible to make the deviation of the principal axis of inertia for the rotating body intended by this invention completely zero, but it is still possible to reduce the deviation by employing the described method.

This invention is not limited to the specific forms shown herein, but rather includes all forms that are not separated from the intention and scope of this invention. The intended scope of this invention is not to be limited by the above embodiments.

This invention was constructed according to new theoretical background as described above relating to a rotating body, and a summary of the effects of the invention will be given below.

In addition to playing a large role in directly reducing the mechanical power loss in a rotating body according or machine using at least one of the same, to the present invention also makes possible machines that operate at higher rotational speeds and are lighter in weight, thus indirectly contributing to conservation of resources.

Additionally, the present invention plays a role in reducing unnecessary heat generation that corresponds to lost power, and contributes in making it possible to reduce the strength required to handle the inertial force caused by the deviation of the principal axis of inertia, by reducing the deviation of the principal axis of inertia.

Yet another effect of the present invention is that the basic technique of this invention plays a role in providing new theory for the design and manufacturing processes of rotating bodies and machines that use rotating bodies, and can be helpful in reducing the expenses related to these processes.

Next, a concrete example will be given to explain the effects of the invention.

For example, in an electric power system which generates power from fossil fuels for power consumption, the present invention could have a great effect on the generation equipment of this system, as it is applicable to gas turbines and their reduction gears, generators, synchronous phase modifiers, electric motors of air conditioning equipment, compressors, fans, etc., all of which are employed in electric power supply and consumption systems.

In considering the rotating bodies or machines that use rotating bodies in this electric power system, even if the average value that the efficiency is improved for each rotating body is only about 10%, the amount of fossil fuels required for the electric power system could be cut to half or less.

It is also expected that this invention would greatly contribute to reducing the amount of environmental pollution due to the carbonic gasses, nitrides, and sulfides discharged from the overall electric power system.

In another example, the rate of fuel consumption during normal operation of an automobile is usually twice that of an automobile which is travelling at constant speed and on a constant surface. In an automobile having a reciprocating engine according to this invention, as described above, the power loss during acceleration and deceleration caused by the deviation of the principal axis of inertia is decreased. Accordingly, the present invention is expected to have a great effect on improving the overall output power by as much as 200%.

For an ordinary compact car in conditions of no wind, if the rolling resistance at a constant speed of 100 km per hour is 15 kg, and the air resistance is 15 kg, the total amount of force necessary would be 30 kg, the weight of the car is 1,000 kg, and the amount of power required would be 30×100×1,000/(3,600×75)=11.1 ps.

The recent increase in output power of small compact cars is spent in the acceleration performance or so called surplus engine horsepower. In order to accelerate to twice the speed in 1 second, 8 times the amount of power would be required. However, in an engine using the prior art, half of the power required for acceleration of the car is spent as unnecessary internal power for engine rotation.

In the reciprocating engine of the present invention, on the other hand the inertial forces that act internally on the rotating body are greatly reduced, and so operation at higher rpm is possible without sacrificing the acceleration performance. Also, by reducing the amount of engine exhaust that corresponds to the improvement of output performance and acceleration performance, the overall rate of fuel consumption is decreased, and can be expected to be half or less than half, of an engine using the prior art technology.

Moreover, because of less heat production, it is possible to simplify the cooling equipment of the engine, greatly contributing to reducing the cost of the engine.

Furthermore, the application of this invention does not have the problems that frequently accompany the application of new technology. Therefore, this invention can be applied rather easily, and will greatly contribute in helping solve problems of energy and environmental pollution that people will have to face in the near future.

What is claimed is:

1. A rotating body which performs rotating or rocking motion, comprising:

a rotatable body having a center axis of rotation or rocking motion, said rotatable body comprising a fan-shaped radial sector defined at any and all predefined angles along said center axis of rotation or rocking motion within said rotatable body, said sector having a small angle and small thickness such that a radius of said fan-shaped radial sector is perpendicular to said center axis of rotation or rocking motion, said radial sector further extending from said center axis of rotation to an external, radially outermost surface of said rotatable body along said small angle and small thickness;

said fan-shaped radial sector having a mass distribution defining a partial axis of center of gravity of said radial sector which is parallel to said center axis of rotation or rocking motion;

said fan-shaped radial sector further having a partial principal axis of inertia essentially matching said partial axis of center of gravity.

2. The rotating body of claim 1 wherein said rotating body is used in energy conversion between electrical energy and mechanical energy.

3. The rotating body of claim 1 wherein said rotating body comprises multiple vanes or blades, and wherein said rotating body is used in the movement, compression, conversion of force, or conversion of power of a fluid such as air, steam, gas combustible matter, water, or oil.

4. The rotating body of claim 1, wherein said rotating body is used in a mechanism that converts between linear motion and rotating motion.

5. The rotating body of claim 1, wherein said rotating body is used in a rotating mechanism of a prime mover or compressor.

6. The rotating body of claim 1, wherein said rotating body comprises a rotating shaft, said center axis of rotation of said rotating body comprises a central axis of said rotating shaft, and wherein said rotating shaft has a power transmission function.

7. The rotating body of claim 1, wherein the rotating motion of said rotating body is supported by multiple bearings.

8. The rotating body of claim 1, in combination with a machine which performs rotational or rocking motion.

9. The combination of claim 8 wherein said machine comprises an electric motor or generator; and
said at least one rotating body comprises a rotor of said electric motor or generator.

10. The combination of claim 8 wherein the rotating motion of said rotating body functions as a smooth flywheel.

11. The combination of claim 8 further comprising a belt for interconnecting said machine with said at least one rotating body, wherein said at least one rotating body comprises a pulley connected to said belt.

12. The machine of claim 8, wherein said rotating body comprises multiple vanes or blades for use in a turbine, propeller, or screw.

13. The combination of claim 8 wherein said rotating body comprises a connecting rod and said machine comprises a prime mover or machine tool.

14. A rotating body which performs rotating or rocking motion, comprising:
a rotatable body having a center axis of rotation or rocking motion, said rotatable body comprising a fan-shaped radial sector defined at any and all predefined angles along said center axis of rotation or rocking motion within said rotatable body, said sector having a small angle and a thickness equalling a total thickness of said rotatable body along said center axis of rotation or rocking motion, and a radius perpendicular to said center axis of rotation or rocking motion, said radial sector further extending from said center axis of rotation to an external, radially outermost surface of said rotatable body along said small angle and thickness;
said fan-shaped radial sector having a mass distribution defining a partial axis of center of gravity of said radial sector which is substantially parallel to said center axis of rotation or rocking motion;
said fan-shaped radial sector further having a partial principal axis of inertia which essentially matches said partial axis of center of gravity.

15. The rotating body of claim 14 wherein said rotating body is used in energy conversion between electrical energy and mechanical energy.

16. The rotating body of claim 14 wherein said rotating body comprises multiple vanes or blades, and wherein said rotating body is used in the movement, compression, conversion of force, or conversion of power of a fluid such as air, steam, gas combustible matter, water, or oil.

17. The rotating body of claim 14, wherein said rotating body is used in a mechanism that converts between linear motion and rotating motion.

18. The rotating body of claim 14, wherein said rotating body is used in a rotating mechanism of a prime mover or compressor.

19. The rotating body of claim 14, wherein said rotating body comprises a rotating shaft, said center axis of rotation of said rotating body comprises a central axis of said rotating shaft, and wherein said rotating shaft has a power transmission function.

20. The rotating body of claim 14, wherein the rotating motion of said rotating body is supported by multiple bearings.

21. The rotating body of claim 14, in combination with a machine which performs rotational or rocking motion.

22. The combination of claim 21 wherein said machine comprises an electric motor or generator; and
said at least one rotating body comprises a rotor of said electric motor or generator.

23. The combination of claim 21 wherein said rotating body further comprises a gear for transmission of force or power.

24. The machine of claim 21, wherein said rotating body comprises multiple vanes or blades for use in a turbine, propeller, or screw.

25. The combination of claim 21 wherein said rotating body comprises a connecting rod and said machine comprises a prime mover or machine tool.

26. A rotating body which performs rotating motion, comprising:
a body comprising a center axis of rotation, wherein part of said body has an eccentric axis parallel to said center axis of rotation, said body further comprising a fan-shaped radial sector, defined at any and all predefined angles, said sector having a small angle and a small thickness with a radius perpendicular to said eccentric axis;
said fan-shaped radial sector further extending from a peak point intersecting said eccentric axis, to an external, radially outermost surface of said rotatable body along said small angle and small thickness, wherein said eccentric axis rotates about said center axis of rotation;
said fan-shaped radial sector comprising a mass distribution defining a partial axis of center of gravity parallel to said eccentric axis;
said fan-shaped radial sector further comprising a partial principal axis of inertia essentially matching said partial axis of center of gravity.

27. The rotating body of claim 26, wherein said rotating body is used in a rotating mechanism of a prime mover or compressor.

28. The rotating body of claim 26, wherein said rotating body comprises a rotating shaft, said center axis of rotation of said rotating body comprises a central axis of said rotating shaft, and wherein said rotating shaft has a power transmission function.

29. The rotating body of claim 26, wherein the rotating motion of said rotating body is supported by multiple bearings.

30. The rotating body of claim 26, in combination with a machine which performs rotational or rocking motion.

31. The combination of claim 30 wherein said rotating body comprises a cam or camshaft for opening or closing an engine valve.

32. The combination of claim 30, wherein said machine comprises a rotary-piston compressor, rotary-piston pump, or rotary piston prime mover.

33. A rotating body which performs rotating motion, comprising:
   a rotating body having a center axis of rotation, a fan-shaped rotating portion extending along said center axis of rotation, and a fan-shaped radial sector, defined at any and all predefined angles along said center axis of rotation within said body, said sector having a small angle, a small thickness, and a radius perpendicular to said center axis of rotation, said radial sector further extending from said center axis of rotation to an external, radially outermost surface of said rotatable body along said small angle and small thickness;
   said fan-shaped radial sector having a mass distribution defining a partial axis of center of gravity parallel to said center axis of rotation;
   said fan-shaped radial sector further comprising a partial principal axis of inertia essentially matching said partial axis of center of gravity.

34. The rotating body of claim 33, wherein said rotating body is used in a mechanism that converts between linear motion and rotating motion.

35. The rotating body of claim 33, wherein said rotating body is used in a rotating mechanism of a prime mover or compressor.

36. The rotating body of claim 33, wherein said rotating body comprises a rotating shaft, said center axis of rotation of said rotating body comprises a central axis of said rotating shaft, and wherein said rotating shaft has a power transmission function.

37. The rotating body of claim 33, wherein the rotating motion of said rotating body is supported by multiple bearings.

38. The rotating body of claim 33, in combination with a machine which performs rotational or rocking motion.

39. The combination of claim 38 wherein said rotating body comprises a crankshaft and said machine comprises a prime mover or machine tool.

40. A rotating body which performs rotating motion, comprising:
   a rotating body having a center axis of rotation;
   a fan-shaped rotating portion that runs along said center axis of rotation; and
   a fan-shaped radial sector defined at any and all predefined angles within said fan-shaped rotating portion and intersecting said center axis of rotation, said radial sector further extending from said center axis of rotation to an external, radially outermost surface of said fan-shaped rotating portion;
   said fan-shaped radial sector comprising a thickness equal to a total thickness of said fan-shaped rotating portion;
   said fan-shaped radial sector extending perpendicular to said center axis of rotation;
   said fan-shaped radial sector comprising a mass distribution defining a partial axis of center of gravity parallel to said center axis of rotation;
   said fan-shaped radial sector further comprising a partial principal axis of inertia essentially matching said partial axis of center of gravity.

41. The rotating body of claim 40, wherein said rotating body is used in a mechanism that converts between linear motion and rotating motion.

42. The rotating body of claim 40, wherein said rotating body is used in a rotating mechanism of a prime mover or compressor.

43. The rotating body of claim 40, wherein said rotating body comprises a rotating shaft, said center axis of rotation of said rotating body comprises a central axis of said rotating shaft, and wherein said rotating shaft has a power transmission function.

44. The rotating body of claim 40, wherein the rotating motion of said rotating body is supported by multiple bearings.

45. The rotating body of claim 40, in combination with a machine which performs rotational or rocking motion.

46. The combination of claim 45 wherein said rotating body comprises a crankshaft and said machine comprises a prime mover or machine tool.

47. The combination of claim 39, wherein said crankshaft comprises at least one journal section for rotatably supporting said crankshaft;
   said at least one journal section comprising at least one cylindrical hole therethrough for reducing power loss.

48. The combination of claim 47, wherein said at least one journal section further comprises at least one fan-shaped oil hole connecting said at least one cylindrical hole with an external surface of said at least one journal section.

49. The combination of claim 46, wherein said crankshaft comprises at least one journal section for rotatably supporting said crankshaft;
   said at least one journal section comprising at least one cylindrical hole therethrough for reducing power loss.

50. The combination of claim 49, wherein said at least one journal section further comprises at least one fan-shaped oil hole connecting said at least one cylindrical hole with an external surface of said at least one journal section.

* * * * *